US00RE47411E

(19) United States
(12) Reissued Patent
Ludwig et al.

(10) Patent Number: US RE47,411 E
(45) Date of Reissued Patent: May 28, 2019

(54) DISAGGREGATED RESOURCES AND ACCESS METHODS

(71) Applicant: RATEZE REMOTE MGMT. L.L.C., Wilmington, DE (US)

(72) Inventors: Thomas Earl Ludwig, San Clemente, CA (US); Mark Adams, Los Angeles, CA (US)

(73) Assignee: RATEZE REMOTE MGMT. L.L.C., Wilmington, DE (US)

(21) Appl. No.: 15/247,779

(22) Filed: Aug. 25, 2016

Related U.S. Patent Documents

Reissue of:
(64) Patent No.: 8,819,092
Issued: Aug. 26, 2014
Appl. No.: 11/205,895
Filed: Aug. 16, 2005

(51) Int. Cl.
*G06F 17/30* (2006.01)
*G06F 12/00* (2006.01)
*H04L 29/12* (2006.01)

(52) U.S. Cl.
CPC ..... *H04L 61/1582* (2013.01); *H04L 61/2015* (2013.01)

(58) Field of Classification Search
CPC ..... H04L 61/1582; H04L 61/2015
USPC ..... 707/827, 828; 709/217, 218, 219
See application file for complete search history.

(56) References Cited

U.S. PATENT DOCUMENTS 4,422,171 A 12/1983 Wortley
4,890,227 A 12/1989 Watanabe et al.
5,129,088 A 7/1992 Auslander et al.
5,193,171 A 3/1993 Shinmura et al.
5,444,709 A 8/1995 Riddle
5,506,969 A 4/1996 Wall et al.
5,546,541 A 8/1996 Drew et al.
5,590,124 A * 12/1996 Robins ..... 370/258
5,590,276 A 12/1996 Andrews
5,617,449 A 4/1997 Tanaka
5,634,111 A 5/1997 Oeda et al.
5,742,604 A 4/1998 Edsall et al.
(Continued)

FOREIGN PATENT DOCUMENTS

CN 1359214 7/2002
CN 1532723 9/2004
(Continued)

OTHER PUBLICATIONS

Beck, Micah, et al., An End-to-End Approach for Globally Scalable network Storage, ACM SIGCOMM Computer Communication Review; vol. 32, Issue 4, Proceedings of the 2002 SIGCOMM Conference; pp. 339-346; Oct. 2002.
(Continued)

*Primary Examiner* — Joshua D Campbell
(74) *Attorney, Agent, or Firm* — Schwabe, Williamson & Wyatt

(57) ABSTRACT

Disaggregated resources distributed among resource nodes provide access to resource consumers by offering resource node information to the resource consumers. Resource node information supplied by each individual resource node comprises incomplete information with respect to the complete disaggregated resource. Resource consumers collect resource node information to create maps of the disaggregated resource, ensure coherency, or manage the disaggregated resource.

30 Claims, 13 Drawing Sheets

(56) References Cited

U.S. PATENT DOCUMENTS 5,758,050 A 5/1998 Brady et al.
5,758,188 A 5/1998 Appelbaum et al.
5,771,354 A 6/1998 Crawford
5,850,449 A 12/1998 McManis
5,867,686 A 2/1999 Conner et al.
5,884,038 A 3/1999 Kapoor
5,889,935 A 3/1999 Ofek et al.
5,930,786 A 7/1999 Carino, Jr. et al.
5,937,169 A 8/1999 Connery et al.
5,948,062 A 9/1999 Tzelnic
5,949,977 A 9/1999 Hernandez
5,983,024 A 11/1999 Fye
5,991,891 A * 11/1999 Hahn et al. ..... H04L 12/437 714/4.21
6,018,779 A 1/2000 Blumenau
6,081,879 A * 6/2000 Arnott ..... 711/173
6,101,559 A 8/2000 Schultz et al.
6,105,122 A 8/2000 Muller et al.
6,128,664 A 10/2000 Yanagidate et al.
6,157,935 A 12/2000 Tran et al.
6,157,955 A 12/2000 Narad et al.
6,181,927 B1 1/2001 Welling et al.
6,202,060 B1 3/2001 Tran
6,246,683 B1 6/2001 Connery et al.
6,253,273 B1 6/2001 Blumenau
6,259,448 B1 7/2001 McNally
6,275,898 B1 8/2001 DeKoning
6,288,716 B1 9/2001 Humpleman et al.
6,295,584 B1 * 9/2001 DeSota et al. ..... 711/147
6,330,236 B1 12/2001 Ofek et al.
6,330,615 B1 12/2001 Gioquindo et al.
6,330,616 B1 12/2001 Gioquindo
6,377,990 B1 4/2002 Slemmer
6,385,638 B1 5/2002 Baker-Harvey
6,389,448 B1 5/2002 Primak
6,396,480 B1 5/2002 Schindler et al.
6,401,183 B1 6/2002 Rafizadeh
6,434,147 B1 8/2002 Brown
6,434,683 B1 8/2002 West et al.
6,449,607 B1 9/2002 Tomita et al.
6,466,571 B1 10/2002 Dynarski et al.
6,470,342 B1 10/2002 Gondi et al.
6,473,774 B1 10/2002 Cellis et al.
6,480,934 B1 11/2002 Hino et al.
6,487,555 B1 11/2002 Bharat et al.
6,535,925 B1 3/2003 Svanbro
6,549,983 B1 4/2003 Han et al.
6,553,028 B1 4/2003 Tang et al.
6,567,863 B1 5/2003 Lafuite et al.
6,587,464 B1 7/2003 Brown
6,597,680 B1 7/2003 Lindskog
6,601,101 B1 7/2003 Lee et al.
6,601,135 B1 7/2003 McBrearty et al.
6,618,743 B1 9/2003 Bennett
6,629,162 B1 9/2003 Arndt
6,629,178 B1 9/2003 Smith
6,629,264 B1 9/2003 Sicola et al.
6,636,958 B2 10/2003 Abboud
6,678,241 B1 1/2004 Gai
6,681,244 B1 1/2004 Cross et al.
6,683,883 B1 1/2004 Czeiger
6,693,912 B1 2/2004 Wang
6,701,431 B2 3/2004 Subramanian et al.
6,701,432 B1 3/2004 Deng et al.
6,710,786 B1 3/2004 Jacobs et al.
6,711,164 B1 3/2004 Le et al.
6,728,210 B1 4/2004 El-Khoury
6,732,171 B2 5/2004 Hayden
6,732,230 B1 5/2004 Johnson et al.
6,741,554 B2 5/2004 D'Amico et al.
6,742,034 B1 5/2004 Schubert
6,754,662 B1 6/2004 Li
6,757,845 B2 6/2004 Bruce
6,772,161 B2 8/2004 Mahalingam
6,775,672 B2 8/2004 Mahalingam et al.
6,775,673 B2 8/2004 Mahalingam et al.
6,795,534 B2 9/2004 Noguchi
6,799,244 B2 9/2004 Tanaka et al.
6,799,255 B1 9/2004 Blumenau et al.
6,826,613 B1 11/2004 Wang et al.
6,834,326 B1 12/2004 Wang et al.
6,853,382 B1 2/2005 Van Dyke et al.
6,854,021 B1 2/2005 Schmidt et al.
6,862,606 B1 3/2005 Major et al.
6,876,657 B1 4/2005 Brewer et al.
6,882,637 B1 4/2005 Le
6,886,035 B2 4/2005 Wolff
6,894,976 B1 5/2005 Banga et al.
6,895,461 B1 5/2005 Thompson
6,895,511 B1 5/2005 Borsato et al.
6,901,497 B2 5/2005 Tashiro et al.
6,904,470 B1 6/2005 Ofer et al.
6,907,473 B2 6/2005 Schmidt et al.
6,912,622 B2 6/2005 Miller
6,917,616 B1 7/2005 Normand et al.
6,922,688 B1 7/2005 Frey, Jr.
6,928,473 B1 8/2005 Sundaram et al.
6,934,799 B2 8/2005 Acharya
6,941,555 B2 9/2005 Jacobs et al.
6,947,430 B2 9/2005 Bilic et al.
6,977,927 B1 12/2005 Bates
6,978,271 B1 12/2005 Hoffman
6,983,326 B1 1/2006 Vigue
6,985,956 B2 1/2006 Luke et al.
6,993,587 B1 1/2006 Basani
7,039,934 B2 5/2006 Terakado et al.
7,051,087 B1 5/2006 Bahl et al.
7,065,579 B2 6/2006 Traversat et al.
7,069,295 B2 6/2006 Sutherland et al.
7,072,823 B2 7/2006 Athanas
7,072,986 B2 7/2006 Kitamura
7,073,090 B2 7/2006 Yanai et al.
7,111,303 B2 9/2006 Macchiano et al.
7,120,666 B2 10/2006 McCanne et al.
7,145,866 B1 12/2006 Ting et al.
7,146,427 B2 12/2006 Delaney et al.
7,149,769 B2 12/2006 Lubbers et al.
7,152,069 B1 12/2006 Santry et al.
7,170,890 B2 1/2007 Frank
7,181,521 B2 2/2007 Knauerhase
7,184,424 B2 2/2007 Frank et al.
7,188,194 B1 3/2007 Kuik et al.
7,200,641 B1 4/2007 Throop
7,203,730 B1 4/2007 Meyer et al.
7,206,805 B1 4/2007 McLaughlin, Jr.
7,225,243 B1 5/2007 Wilson
7,237,036 B2 6/2007 Boucher et al.
7,243,144 B2 7/2007 Miyake
7,254,620 B2 8/2007 Iwamura
7,260,638 B2 8/2007 Crosbie
7,263,108 B2 8/2007 Kizhepat
7,278,142 B2 10/2007 Bandhole et al.
7,296,050 B2 11/2007 Vicard
7,327,735 B2 2/2008 Robotham
7,333,451 B1 2/2008 Khalil et al.
7,353,266 B2 4/2008 Bracewell et al.
7,389,358 B1 6/2008 Matthews et al.
7,404,000 B2 7/2008 Lolayekar
7,406,523 B1 7/2008 Kruy et al.
7,415,018 B2 8/2008 Jones et al.
7,421,736 B2 9/2008 Mukherjee
7,428,584 B2 9/2008 Yamamoto et al.
7,436,789 B2 10/2008 Caliskan et al.
7,447,209 B2 11/2008 Jeffay et al.
7,463,582 B2 12/2008 Kelly et al.
7,475,124 B2 1/2009 Jiang
7,526,577 B2 4/2009 Pinkerton et al.
7,535,913 B2 5/2009 Minami
7,536,525 B2 5/2009 Chandrasekaran
7,558,264 B1 7/2009 Lolayekar
7,599,342 B2 10/2009 Frank
7,602,773 B2 10/2009 Frank
7,620,981 B2 11/2009 Frank
7,643,476 B2 1/2010 Frank

(56) References Cited

U.S. PATENT DOCUMENTS 7,649,880 B2 1/2010 Adams
7,688,814 B2 3/2010 Frank
7,698,526 B2 4/2010 Frank
7,702,850 B2 4/2010 Ludwig
7,707,304 B1 4/2010 Lolayekar
7,720,058 B2 5/2010 Frank
7,742,454 B2 6/2010 Venkatsubra
7,742,473 B2 6/2010 Adams
7,743,214 B2 6/2010 Adams
7,870,271 B2 1/2011 Frank
7,882,252 B2 2/2011 Frank
7,912,059 B1 3/2011 Squire
7,916,727 B2 3/2011 Frank
7,924,881 B2 4/2011 Frank
8,005,918 B2 8/2011 Frank
8,387,132 B2 2/2013 Frank
8,473,578 B2 6/2013 Frank
8,694,640 B2 4/2014 Frank
8,726,363 B2 5/2014 Frank
8,819,092 B2 8/2014 Ludwig
2001/0020273 A1 9/2001 Murakawa
2001/0026550 A1 10/2001 Kobayashi
2001/0034758 A1 10/2001 Kikinis
2001/0037371 A1 11/2001 Ohran
2001/0049739 A1 12/2001 Wakayama et al.
2002/0016811 A1 2/2002 Gall
2002/0026558 A1 2/2002 Reuter
2002/0029256 A1 3/2002 Zintel
2002/0029286 A1 3/2002 Gioquindo et al.
2002/0031086 A1 3/2002 Welin
2002/0035621 A1 3/2002 Zintel
2002/0039196 A1 4/2002 Chiarabini
2002/0052962 A1 5/2002 Cherkasova et al.
2002/0062387 A1 5/2002 Yatziv
2002/0065875 A1 5/2002 Bracewell et al.
2002/0087811 A1* 7/2002 Khare et al. ..... 711/146
2002/0091830 A1 7/2002 Muramatsu
2002/0126658 A1 9/2002 Yamashita
2002/0133539 A1 9/2002 Monday
2002/0138628 A1 9/2002 Tingley et al.
2002/0165978 A1 11/2002 Chui
2003/0018784 A1* 1/2003 Lette et al. ..... 709/226
2003/0023811 A1 1/2003 Kim et al.
2003/0026246 A1 2/2003 Huang et al.
2003/0041138 A1 2/2003 Kampe
2003/0065733 A1 4/2003 Pecone
2003/0069995 A1 4/2003 Fayette
2003/0070144 A1* 4/2003 Schnelle et al. .. G06F 17/30917 715/239
2003/0079018 A1 4/2003 Lolayekar
2003/0081592 A1 5/2003 Krishnarajah et al.
2003/0093567 A1 5/2003 Lolayekar
2003/0101239 A1 5/2003 Ishizaki
2003/0118053 A1 6/2003 Edsall et al.
2003/0130986 A1* 7/2003 Tamer et al. ..... 707/1
2003/0152041 A1 8/2003 Herrmann
2003/0161312 A1 8/2003 Brown et al.
2003/0172149 A1 9/2003 Edsall et al.
2003/0172157 A1 9/2003 Wright et al.
2003/0182349 A1 9/2003 Leong et al.
2003/0202510 A1 10/2003 Witkowski et al.
2003/0204611 A1 10/2003 McCosh et al.
2004/0025477 A1 2/2004 Sichera et al.
2004/0047367 A1 3/2004 Mammen
2004/0078465 A1 4/2004 Coates et al.
2004/0088293 A1 5/2004 Daggett
2004/0100952 A1 5/2004 Boucher et al.
2004/0148380 A1 7/2004 Meyer et al.
2004/0160975 A1 8/2004 Frank
2004/0162914 A1 8/2004 St. Pierre et al.
2004/0170175 A1 9/2004 Frank
2004/0181476 A1* 9/2004 Smith et al. ..... G06Q 40/00 705/35
2004/0184455 A1 9/2004 Lin
2004/0213226 A1 10/2004 Frank
2004/0215688 A1* 10/2004 Frank et al. ..... H04L 12/28 709/200
2005/0033740 A1 2/2005 Cao et al.
2005/0044199 A1 2/2005 Shiga et al.
2005/0058131 A1 3/2005 Samuels et al.
2005/0068924 A1 3/2005 Lindskog
2005/0102522 A1 5/2005 Kanda
2005/0138003 A1 6/2005 Glover
2005/0144199 A2 6/2005 Hayden
2005/0165883 A1* 7/2005 Lynch ..... 709/200
2005/0166022 A1* 7/2005 Watanabe ..... 711/162
2005/0175005 A1 8/2005 Brown
2005/0198371 A1 9/2005 Smith et al.
2005/0246401 A1 11/2005 Edwards et al.
2005/0259646 A1 11/2005 Smith et al.
2005/0267929 A1* 12/2005 Kitamura ..... 709/201
2005/0270856 A1 12/2005 Earhart et al.
2005/0286517 A1 12/2005 Babbar et al.
2006/0026257 A1 2/2006 Frank
2006/0029068 A1 2/2006 Frank
2006/0029069 A1 2/2006 Frank
2006/0029070 A1 2/2006 Frank
2006/0036602 A1 2/2006 Unangst et al.
2006/0045089 A1 3/2006 Bacher et al.
2006/0077902 A1 4/2006 Kannan et al.
2006/0101130 A1 5/2006 Adams
2006/0126118 A1 6/2006 Nagata
2006/0126666 A1 6/2006 Frank
2006/0133365 A1 6/2006 Manjunatha et al.
2006/0168345 A1* 7/2006 Siles et al. ..... 709/245
2006/0176903 A1 8/2006 Coulier
2006/0182107 A1 8/2006 Frank
2006/0206662 A1 9/2006 Ludwig
2006/0253543 A1 11/2006 Frank
2006/0272015 A1 11/2006 Frank
2007/0043771 A1 2/2007 Ludwig
2007/0083662 A1 4/2007 Adams
2007/0101023 A1 5/2007 Chhabra et al.
2007/0110047 A1* 5/2007 Kim ..... 370/389
2007/0147347 A1 6/2007 Ristock
2007/0168396 A1 7/2007 Adams
2007/0230476 A1 10/2007 Ding
2007/0237157 A1 10/2007 Frank
2008/0181158 A1 7/2008 Bouazizi et al.
2008/0279106 A1 11/2008 Goodfellow et al.

FOREIGN PATENT DOCUMENTS

EP 0485110 5/1992
EP 0654736 5/1995
EP 0700231 3/1996
EP 0706113 4/1996
GB 2285558 7/1995
JP 61033054 2/1986
JP 62233951 10/1987
JP 63090942 4/1988
JP 2005265914 10/1993
JP 05347623 12/1993
JP 7325779 12/1995
JP 08251198 9/1996
JP 09149060 6/1997
JP 10333839 12/1998
JP 2000267979 9/2000
JP 2001094987 4/2001
JP 2001359200 12/2001
JP 2002252880 9/2002
JP 2002318725 10/2002
JP 2004054562 2/2004
JP 2004056728 2/2004
JP 2005265914 9/2005
TW 223167 11/2004
WO 0101270 4/2001
WO 02015018 2/2002
WO 02071775 9/2002
WO 04025477 3/2004
WO 04044732 5/2004
WO 04044753 5/2004
WO 04045149 5/2004
WO 05017738 2/2005

(56) References Cited

FOREIGN PATENT DOCUMENTS

| | | |
|---|---|---|
| WO | 05072179 | 8/2005 |
| WO | 06098753 | 9/2006 |
| WO | 06127013 | 11/2006 |
| WO | 07021289 | 2/2007 |
| WO | 07043999 | 4/2007 |
| WO | 07120685 | 10/2007 |
| WO | 07149563 | 12/2007 |

OTHER PUBLICATIONS

Gibson, Garth; A Cost Effective High-Bandwidth Storage Architecture; ACM SIGOPS Operating Systems Review, col. 32, issue 5, pp. 92-103; 1998.
Gibson, Garth; File Server Scaling with Network-Attached Secure Disks; Joint Int'l Conference on Measurement & Modeling of Computer Systems Proceedings of the 1997 ACM SIGMETRICS Int'l Conference on Measurement & Modeling of Computer Systems; pp. 272-284; 1997.
Robinson, Chad; A Guide to Virtual Services; Linux Journal, vol. 1997 Issue 35; Mar. 1997.
Virtual Web mini-HOWTO; Parag Mehta; www.faqs.or/docs/Linux-mini/Virtual-Web.html; Jun. 6, 2001.
WebTen User's Guide; Version 3.0, Jan. 2000; http://www.tenan.com/products/webten/WebTenUserGuide/1_Introduction.html; Jan. 2000.
WebTen User's Guide; Version 7.0; http://www.tenon.com/products/webten/WebTenUserGuide/8_VirtualHosts.html, Chapter 8; Mar. 2008.
Listing of Related Cases, dated Oct. 30, 2017, Schwabe Williamson & Wyatt, 3 pages.
Anderson, et al., "Serverless Network File Systems," in Proceedings of the 15th Symposium on Operating Systems Principles, Dec. 1995.
Bruschi, et al., "Secure multicast in wireless networks of mobile hosts: protocols and issues", Mobile Networks and Applications, vol. 7, issue 6 (Dec. 2002), pp. 503-511.
Chavez, A Multi-Agent System for Distributed Resource Allocation, MIT Media Lab, XP-002092534, Int'l Conference on Autonomous Agents, Proceedings of the First Int'l Conference on Autonomous Agents, Marina del Rey, California, US, Year of Publication: 1997.
Cisco Systems, "Computer Networking Essentials," Copyright 2001.
IBM Technical Disclosure Bulletin, Vo. 35, No. 4a, pp. 404-405, XP000314813, Armonk, NY, USA, Sep. 1992.
Kim et al., "Internet Multicast Provisioning Issues for Hierarchical Architecture", Dept of Computer Science, Chung-Nam National University, Daejeon, Korea, Ninth IEEE International Conference, pp. 401-404., IEEE, published Oct. 12, 2001.
Lee et al. "A Comparison of Two Distributed Disk Systems" Digital Systems Research Center—Research Report SRC-155, Apr. 30, 1998, XP002368118.
Lee, et al. "Petal: Distributed Virtual Disks", 7th International Conference on Architectural Support for Programming Languages and Operation Systems. Cambridge, MA., Oct. 1-5, 1996. International Conference on Architectural Support for Programming Languages and Operation Systems (ASPLOS), New, vol. Conf. 7, pp. 84-92, XP000681711, ISBN: 0-89791-767-7, Oct. 1, 1996.
Lin, et al., "RMTP: A Reliable Multicast Transport Protocol," Proceedings of IEEE INFOCOM '96, vol. 3, pp. 1414-1424, 1996.
Quinn, et al., "IP Multicast Applications: Challenges and Solutions," Network Working Group, RFC 3170, Sep. 2001.
Satran et al. "Internet Small Computer Systems Interface (iSCSI)" IETF Standard, Internet Engineering Task Force, IETF, CH, XP015009500, ISSN: 000-0003, Apr. 2004.
Satran et al., "Internet Small Computer Systems Interface (iSCSI)" Internet Draft draft-ietf-ips-iscsi-19.txt, Nov. 3, 2002.
VMWare Workstation User's Manual, VMWare, Inc., p. 1-420, XP002443319; www.vmware.com/pdf/ms32_manual.pdf; p. 18-21; p. 214-216; p. 273-282; copyright 1998-2002.
International Search Report for Application No. PCT/US02/40205 dated May 12, 2003.
International Search Report for Application. No. PCTUS05/01542 dated Aug. 25, 2008.
International Search Report and Written Opinion, issued in PCT Patent Application No. PCT/US2005/036022, dated Mar. 3, 2006, 10 pages.
International Preliminary Report on Patentability, issued in PCT Patent Application No. PCT/US2005/036022, dated Feb. 20, 2008, 8 pages.
E. K. Lee, et al., "Petal: Distributed Virtual Disks," 7th International Conference on Architectural Support for Programming Languages and Operation Systems, 7 ed., ASPLOS (US), p. 84-92, (Oct. 1, 1996).
E. K. Lee, et al., "A Comparison of Two Distributed Disk Systems," SRC—Reserach Report, Systems Reserch Center (Palo Alto, US), p. all, (Apr. 30, 1998).
International Search Report for Application No. PCT/US02/40205 dated May 27, 2004.
Ki-Il Kim et al., "Internet Multicast Provisioning Issues for Hierarchical Architecture", 2001, IEEE.
PCT International Search Report for PCT App. No. PCTUS05/01542 dated Aug. 25, 2008.
"Computer Networking Essentials" Copyright 2001, Cisco Systems, Inc., 2001.
"Limited distributed DASD Checksum, a RAID Hybrid" IBM Technical Disclosure Bulletin, vol. 35, No. 4a, Sep. 1992, pp. 404-405, XP000314813 Armonk, NY, USA.
Satran et al., iSCSI, Internet Draft draft-ietf-ips-iscsi-19.txt.

* cited by examiner

Disaggregated Resource with
Redundant Serial Groups

DISAGGREGATED RESOURCES AND ACCESS METHODS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATION*

*The present is a reissue of U.S. patent application Ser. No. 11/205,895, filed Aug. 16, 2005, issued as U.S. Pat. No. 8,819,092.*

FIELD OF THE INVENTION

The field of invention is disaggregated resources especially storage devices, memories, displays, CPUs, or other computing resources.

BACKGROUND OF THE INVENTION

As computers have increased in capabilities the demand for computing resources has also grown. In fact, the demand for computing resources has grown to the point that, in many cases, far outstrips the capabilities of a single computer to deliver resources to a user or application. For example, enterprises have been aware of this issue for many years and continue to buy racks of servers, storage arrays, or other computing resources at great cost to satisfy their needs for computing resources. In addition, many consumers employ external hard disk drives to store massive amounts of personal media data because their personal computers lack sufficient capacity. There are many reasons that drive the demand and proliferation of computing resources including legislation that affect enterprises, applications, ubiquitous digital cameras, media players, and countless other reasons. Industry has responded to the demand by producing products that provide computer resources to users and applications where the computing resource products are no longer centralized to a single computer. Furthermore, the industry is tending toward a distribution of computing resources where individual computer systems offer their capabilities or services to other users and applications where on example includes NAS file servers.

Yet another trend in the industry is to disaggregate resources into their constituent resource device elements, for example USB disk drives or SAN systems. However, these approaches do not address combining a number of resource elements together into a coherent virtual whole from the perspective of an arbitrary set of resource consumers, but rather these approaches still follow a centralized approach.

Even though the industry combines computing resources into a centralized set of capabilities or services as in SAN systems, it is still desirable to have the computing resources exist as individual resource nodes. Centralized resources imply further costs to due to the expense of the additional computer hardware and infrastructure; introduce yet another point of potential failure beyond the computing resources; create a bottleneck that all resource consumers must pass through, and so on. Disaggregated resources that comprise a collection of individual resource nodes that work independently but operate as a whole without a centralized controller or manager alleviate many of these problems. Individual resource nodes carry a smaller per unit price tag reducing incremental cost and offering stronger scalability, introduce no additional points of failure, do not require out-of-band communication increasing responsiveness, and operate in parallel increasing performance. Some known examples of distributed resources include clusters or applications like SETI@Home that offer CPU bandwidth as the computer resource. These examples are "distributed resources" where they rely on complete computer systems rather than individual computing resources and operate at an application level rather than at a resource device level.

Offering true disaggregated resources that comprise a number of resource nodes has a number of critical problems that must be overcome in order to deliver a solid disaggregated solution. First, networks are inherently unreliable and have latency; consequently resource nodes might loose connectivity with a resource consumer. Connectivity is important where the state or coherency of the resource from the perspective of a resource consumer is important. Second, multiple resource consumers can have different "views" of a disaggregated resource from each other; therefore, each resource consumer can have a different resource map used to access the disaggregated resource. Furthermore, most computer systems require access to a resource at a very fine level of granularity well below the resource device level. For example, when a CPU addresses memory, it attempts to reference a single byte or word. Such fine level granularity access is difficult in a disaggregated resource because a resource consumer does not necessarily have a sufficiently detailed and complete map of the disaggregated resource. Third, the organization of the resource nodes can be quite complex depending on a number of factors including type of resource involved, the roles or responsibilities of each resource node, resource node location, or other implementation specific information. Fourth, operating systems have to interpret the disaggregated resource as if it were locally connected in order to provide applications seamless, transparent integration with the computing environment.

A number of attempts have been made previously to provide a solid solution addressing the problems encountered when building a disaggregated resource. BitTorrent™, a peer-to-peer file transfer system, offers redundant file storage as a distributed resource where each resource node is complete computer system offering file storage. BitTorrent™ places redundant copies of data on multiple peers to alleviate some of the risk of an unreliable network; however, the peers are outside the control of the ultimate user so the user does not know if a peer is lost. Any owner of a BitTorrent™ system can take down their computer reducing the overall performance for a remote unknown user. Although each BitTorrent™ user has a different view of the network based on connectivity, a user can not, in a deterministic fashion, determine the extent and usability of the system. Unfortunately, BitTorrent™ is an application level protocol and does not provide a transparent solution of a storage resource that allows an operating system or application to read and write data at will. Cleary, BitTorrent™ offers some utility for high level file transfers; it is not suitable for consumer or enterprise system due to the lack of control, determinism, fine level access, or performance. BitTorrent™ and other peer-to-peer systems have not addressed the need for resource consumers to understand a complete map for a coherent disaggregated resource at an elemental level.

Hitachi's U.S. Pat. No. 4,890,227 offers a resource management system for operating systems of large scale computers. The memory, CPUs, I/O channels, and storage devices represent disaggregated resources. The management system relies on a set of policies that are continually updated and deleted to equitably and autonomously assign resources to process units (programs, threads, or tasks). The Hitachi patent does not address issues of resource coherency over an unreliable communication path or issues of multiple resource consumers (process units) having different views of the resources because a centralized management system handles all the resources for the process units. The Hitachi patent does not provide insight on how a resource consumer will manage and access resource nodes of a disaggregated resource that extend beyond the core computer. Even though the Hitachi patent addresses more elemental resources, the centralized resource management system does not allow resource consumers build their own view of the system or to function independently. Furthermore, the Hitachi patent offers no insight how to address fine level of structure of a resource.

Microsoft's U.S. Pat. No. 6,912,622 attempts to resolve some of problems associated with a distributed resource that are similar to the problems associated with a disaggregated resource where the distributed resource is a peer-to-peer system. The Microsoft patent uses an underlying statistical assumption regarding the probability of a first peer knowing a second peer's ID based on the "distance" between the first peer's ID and the second peer's ID. Through this structure, the Microsoft patent offers an efficient peer-to-peer name resolution system which allows a peer to keep track of and to find other peers by a useable organization scheme resulting in a map of the system. However, the structure only offers a way to access peers across a peer-to-peer network, but does not offer developers a way to access a fine level of detail within a peer as required by a truly disaggregated resource. Furthermore, the Microsoft patent does not address the need for a resource consumer to know the coherency of the disaggregated resource as resource nodes lose connectivity. In a peer-to-peer network, if a peer drops out, other peers don't necessary care. However, if the a resource node representing a CPU, memory, or storage device drops out of connectivity, all resource consumers using the disaggregated resource will need to know. Finally, the Microsoft patent does not address more elemental resource nodes.

Adaptec's U.S. Pat. No. 6,922,688 offers a method of accessing data objects where portions of the object are found through obtaining referential maps comprising logical storage locations and physical maps comprising the physical storage locations associated with the logical storage locations. Although the patent teaches how to access data objects distributed across a plurality of physical locations, it does not enable disaggregated resources, how to access such resources, how to operate disaggregated resources as one functional whole resource, or how to maintain a disaggregated resource over an unreliable network. In addition, although one aspect of the present invention comprises a split map, that map is a split map of disaggregated resources not a split map of data objects. Moreover, as discussed below, the term resource, as used herein, excludes data objects.

None of the previously presented examples fully address the problems encountered for building and accessing disaggregated resources. A more complete solution handles unreliable communications, resource consumer and resource node independence, resource coherency, fine level access to the resource, and applies to many types of elemental resources rather than create a solution for a single type of resource. Such a solution would have the following characteristics:

- A disaggregated resource would comprise independent, efficient resource nodes that do not necessarily communicate with each other and do not require out-of-band communications
- The resource nodes provide information about their role in the disaggregated resource to resource consumers that request the information
- Resource consumers discover and access the resources without accessing extraneous systems
- Resource consumers construct their own view of the disaggregated resource based on information from the resource nodes
- A map of the resource provides access to a fine level of granularity to the resource at or below the resource device level Thus, there remains a considerable need apparatus for disaggregated resources and for methods of accessing disaggregated resources.

SUMMARY OF THE INVENTION

The present invention is directed toward disaggregated resources that are spread among a number of resource nodes. The resource nodes provide information about the nodes to resource consumers who then create maps of the resource in order to properly access the resource. The resource node information from a single resource node comprises insufficient information for a useable map of the disaggregated resource. Resource node information from multiple resource nodes allows for the creation of a more complete, useable map from perspective of a resource consumer. Another aspect of the invention provides for resource maps to be split among elements of the disaggregated resource and resource consumers in order to provide fine level access to the resource without the resource consumer storing an entire map of the resource.

Another aspect of the invention is directed toward methods for accessing the disaggregated resource through organizing resource nodes into the disaggregated resource, assigning resource node information, and assessing if the disaggregated resource has coherency. The resource nodes respond to discovery messages by providing their resource node information from which the resource consumers construct a map on how to access the resource. Resource consumers that wish to access the resource include resource consumers, resource managers, or other interested parities.

In a preferred embodiment resource node information includes resource name, resource node name, resource node type, or resource attributes. Resource consumers that interact with disaggregated resources use the resource name to identify a particular resource. Furthermore, each resource node that composes the disaggregated resource includes a resource node name to differentiate themselves in cases where the nodes offer redundant physical resources. Through the use of names, the resource consumers select which resources are of interest and which resource nodes compose the disaggregated resource.

A resource node type provides resource consumers with the necessary information on how to access a specific node within the disaggregated resource. Resource nodes function independently of each and focus only on their prescribed roles and responsibilities. Consequently, resource node attributes provide the resource consumers information on node state with respect to the disaggregated resource if resource state is critical relative to other nodes and provide resource node role information. Contemplated attributes include coherency attributes that indicate when a disaggregated resource has lost coherency. If a disaggregated resource loses coherency, then one or more resource nodes have lost contact with active resource consumers; consequently, the disaggregated resource might not operate correctly or might not offer correct services. Resource node information from an individual resource node comprises incomplete information for resource consumers to interact with the complete disaggregated resource.

In a preferred embodiment a resource consumer collects resource node information from resource nodes to create a map of the disaggregated resource. The resource map can be the same from one resource consumer to another or can be different from one resource consumer to another depending on what the resource consumers requires and how the disaggregated resource is configured. Furthermore, the resulting resource map has sufficient detail to allow a resource consumer to access the disaggregated resource. The resource map provides a translation of a resource element ID to a physical resource address, location, or capability. It is specifically contemplated that the resource map splits into a number of resource sub-maps where each sub-map provides a further translation. For example, a resource consumer accessing a disaggregated resource creates a top level resource sub-map that comprises a translation of a resource element ID to an address of a resource node. Each resource node also comprises a resource sub-map that translates a resource element ID to a physical resource ID. Consequently, it is contemplated that a resource map has a granularity below a resource unit level to a partition that represents some fraction of a physical resource. In addition, it is specially contemplated that a resource map has granularity below a partition level to an individual addressable physical resource element level, or even smaller.

Some embodiments may include a storage medium having instructions that, when executed, results in a resource node and/or a resource consumer operating as described herein with respect to other embodiments.

Contemplated disaggregated resources include, but not limited to, computer related resources including storage, displays, CPU, input devices, or memory. Non-computer related resources are also contemplated including electrical power, or networking bandwidth. Specifically contemplated examples include disaggregated storage or disaggregated video displays. Furthermore, a disaggregated resource could comprise a heterogeneous mix of physical resources. For example, a number of disk drives, displays, CPUs, or memory where each individual item is disaggregated, then forms together into a complete disaggregated computer system.

Glossary

The following descriptions refer to terms used within this document. The terms are provided to ensure clarity when discussing the various aspects of the invention matter without implied limitations.

"Access Fault" means an error condition raised by a resource node when a resource consumer has requested access to a resource beyond the capabilities of the resource node. When the consumer receives the access fault, the consumer reconsiders the request and then forms a more reasonable request, or takes other desired actions.

"Resource" means a fungible commodity required or desired by a resource consumer for the consumer's operation. Resources include displays, I/O channels, data storage, network bandwidth, processor bandwidth, or other items used by a resource consumer even those that pertain to other systems beyond computing, for example electrical power. "Physical Resource" means a physical instantiation of a resource at the device level. Examples of physical resources include video displays, hard disk drives, memory, processing units, media cards, network interfaces, power outlets, or other items used by resource consumers. Resources have granularity; therefore, "resource partition" means a logical representation of a portion of a physical resource. For example, a resource partition of a hard disk drive includes a logical partition on the disk that is addressable external to the disk. Another example of a resource partition includes a range of pixels in an (x,y) coordinate system on a video display representing a logical frame that is addressable external to the display. Further granularity is possible; therefore, "resource element" means a natural, logical unit of the resource that can be addressed. An example of a resource element for a storage system based on a hard disk drive includes a data block on the disk. Yet another example of a resource element includes a pixel of a video display.

On the other hand, the term "resource," as used herein does not include a file or other data object because data objects are not fungible.

"Resource Consumer" means an entity that utilizes a commodity in order to deliver its desired functionality. Resource consumers have the ability to operate independently of other resource consumers. Further, resource consumers share physical resources though each resource consumer could have a completely different perspective of the resource. Example resource consumers include applications, computers, operating systems, file systems, users, management software, or other entities that have interest in the commodity.

"Resource Map" means a translation from a virtual addressing scheme to a physical addressing scheme of a physical resource. Resource maps comprise software or data that translates a resource element ID into a physical address. Resource maps can split into a number of resource sub-maps where each sub-map comprises a further translation to a final physical address. Resource maps offer varying degrees of granularity of mapping virtual resource elements to physical locations. For example, a network storage system can offer a resource map with a granularity at the disk level, at the partition level, at the data block level, or even below the data block level by employing extra operations. "Split Resource Map" means a resource map split into a plurality of resources sub-maps. The resource sub-maps reside in individual memories where necessary.

"Resource Node" means a logical construct executing on a processor comprising software or firmware that provides a representation of a resource partition. Resource nodes comprise resource node information including and resource maps. Resource nodes have the ability to function independently of other resource nodes. This implies resource nodes do not require out-of-band management to communicate with other resource nodes in order to deliver a coherent disaggregated resource. An example of a resource node is a combination of hardware, software, or firmware that functions as a logical partition of a disk. The logical disk partition accepts read or write requests based on a logical block address (LBA) of a data block, and then performs the requested operation on the disk. Yet another example includes a combination of hardware, software, or firmware that functions as a logical video frame. The logical video frame similarly accepts pixel display commands then instructs a monitor to modify the pixel within the bounds of the logical frame. Resource nodes comprise a resource map to aid in the translation of a resource element ID, including an LBA or logical (x,y) coordinate of a pixel, to a physical address, a disk sector, track, cylinder, or (x,y) coordinate on a monitor.

"Resource Node Attribute" means an attribute within a resource node used by resource consumers external to the resource node to determine if the disaggregated resource suffers from a potential problem or to determine the resource node's role. Resource node attributes include coherency attributes. If a coherency attribute or collection of coherency attributes indicates a disaggregated resource has lost coherency, a resource consumer can then determine the best alternative steps to deal with a potential problem.

The teachings herein may be advantageously employed by developers of disaggregated systems to develop, manage, deploy, or utilize the systems with reduce costs and overhead. Disaggregate resources access methods can be used to manage large arrays of storage devices, arrays of video displays, or other resources that lend themselves to disaggregation.

Various objects, features, aspects, and advantages of the present invention will become more apparent from the following detailed description of the preferred embodiments of the invention, along with the accompanying drawings in which like numerals represent like components.

DETAILED DESCRIPTION

In order to provide clarity for the detailed description of the inventive subject matter, two example embodiments are provided. Neither implementation should be interpreted as a limitation of the subject matter in any way. The first example embodiment focuses on a disaggregated storage array comprising resource nodes in the form of logical disk partitions and the second embodiment focuses a disaggregate video display comprising resource nodes in the form of logical video display frames.

Disaggregated Resources

Figure 1:
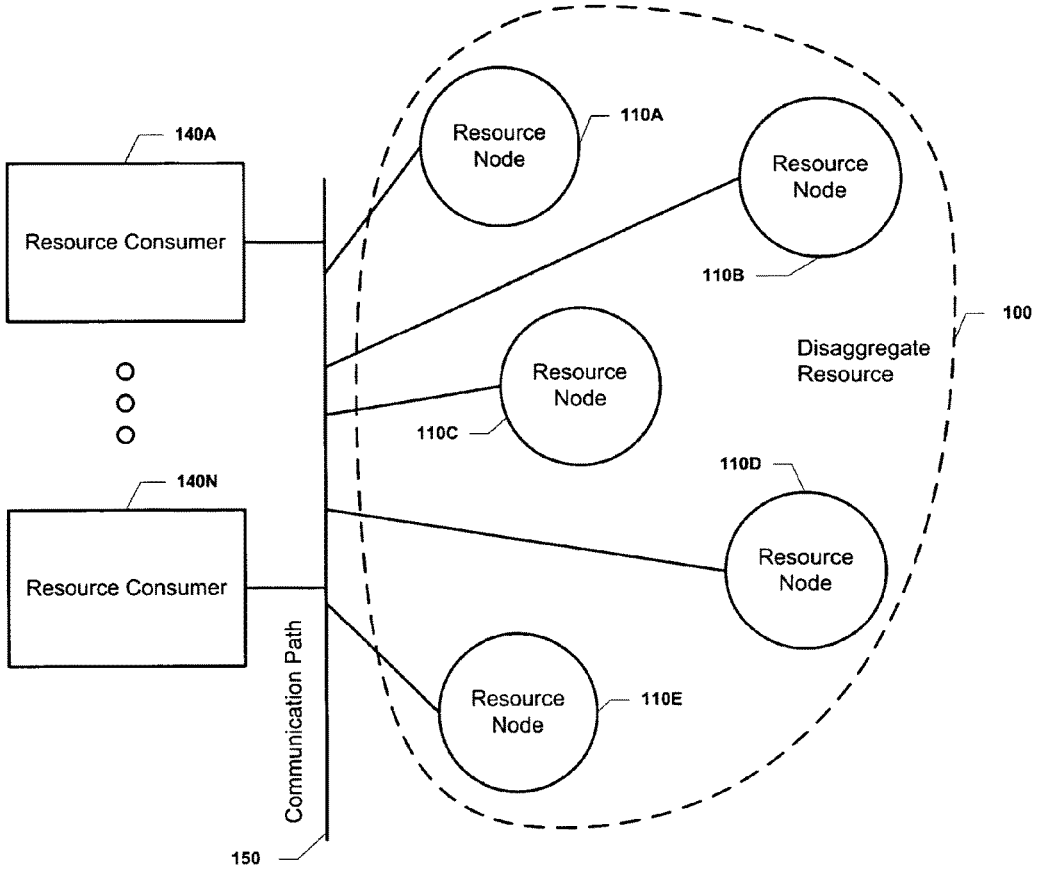
FIG. 1 is a schematic of a disaggregated resource.

FIG. 1 presents a schematic for a disaggregated resource comprising more than one resource nodes. Disaggregated resource 100 comprises resource nodes 110A through 110E. Although five resource nodes are shown, the number of resource nodes varies as necessary to fulfill the requirements of the disaggregated resource. Resource consumers 140A through 140N communicate with disaggregated resource 100 through communication path 150 by communicating with resource nodes 110A through 110E.

In a preferred embodiment, resource consumers 140A through 140N take the form of an electrical device running a driver on a processing unit. The driver allows an application or applications running on the electrical device to interact with the resource provided by disaggregated resource 100 and resource nodes 110A through 110E in a manner that is transparent to the applications. Consequently, disaggregated resource 100 appears as a local resource from the perspective of the applications. Examples of resource consumers include computers, operating systems, file systems, management software, or other entities that require access to disaggregated resource 100.

Resource consumers 140A through 140N interact with disaggregated resource 100 independently from each other. Therefore, each resource consumer has its own view of disaggregated resource 100. Resource consumers 140A through 140N can alter resource node information stored on resource nodes 110A through 110E. It is contemplated that altering resource node information provides for indicating changes in the disaggregated resource.

Communication path 150 provides for a sustained communication between resource consumers 140A through 140N and resource nodes 110A through 110E. It is specifically contemplated that communication path 150 is unreliable and could result in one or more of the resource nodes 110A through 110E losing connectivity with resource consumers 140A through 140N. Contemplated communication paths include packet switched networks, computer busses, wireless transmission, or other communication mechanisms.

Resource Nodes

Figure 2:
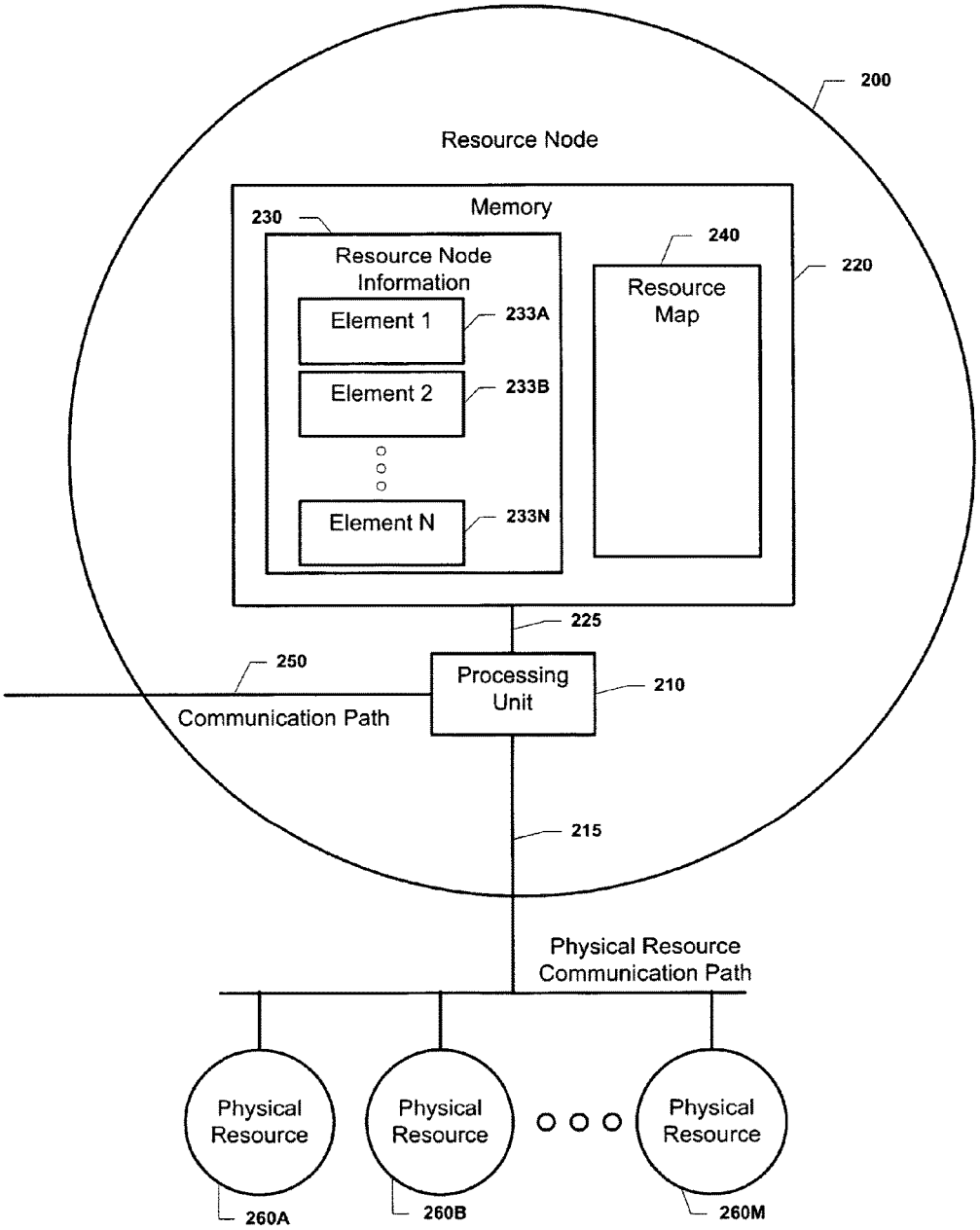
FIG. 2 is a schematic of a possible physical embodiment for a resource node.

FIG. 2 presents a schematic for a possible embodiment of a resource node. Resource node 200 comprises processing unit 210 and memory 220. Processing unit 210 communicates with other entities, including resource consumers, over communication path 250. In addition processing unit 220 communicates with physical resources 260A through 260M over physical resource communication path 215. Processing unit 210 communicates with memory 220 over bus 225. Memory 220 further comprises resource node information 230 and resource map 240.

Memory 220 comprises resource node instructions that run on processing unit 210, and data for use by processing unit 210 or resource consumers. Data structures include resource node information 230, or resource map 240. Resource node information 230 includes one or more information elements as indicated by resource information elements 233A through 233N and conveys information regarding resource node 200 to resource consumers over communication path 250. Contemplated examples of resource node information include resource name, resource node type, resource node name, resource node attribute, address, or other resource node information of interest to a resource consumer. Resource consumers use resource node information to determine the role of a specific resource node within a disaggregated resource, among other things. Resource map 240 provides processing unit information on how to translate requests for resource access from resource consumers into an access of physical resource 260A through 260M. It is contemplated that resource map 240 provides information on translating resource consumer requests across one or more physical resources, at a partition level of a physical resource, or at levels smaller than a partition. Resource node 200 uses resource map 240 to aid in determining the responsibility of resource node 200 with regards to physical resources 260A through 260M.

Contemplated embodiments of resource node 200 include modules comprising a combination of hardware, software, or firmware. Modules in the form of adapters plug into physical resource devices to provide resource node capabilities. Furthermore, adapters comprising embedded boards, chips, ASICs, FPGAs, or other components integrate into a larger physical resource device to provide resource node capabilities. In addition, modules include enclosures that house one or more physical resource devices. Such modules include operating systems and communication stacks as firmware infrastructure to support resource node functionality. Because modules can comprise software, it is also contemplated software programs or drivers install on computers or other computer-like systems to provide resource node capabilities for the individual resources within the computer. Contemplated software or firmware executing on processing unit 210 that provides resource node 200 with its functionality including monolithic code that supports multiple resource nodes, collections of functions operating together, or individual tasks or threads.

Resource node 200 operates as a virtual structure that presents a logical representation of a portion of physical resource 260A through 260M to resource consumers. Contemplated logical representations include logical partitions of disk drives or logical video frames of a monitor. The logical representations combine to form the complete disaggregated resource, which itself is a logical representation of a resource.

If resource node 200 exists in a module that supports multiple other resource nodes, it is contemplated all resource nodes have unique addresses. In a preferred embodiment, each resource node acquires an address from external to the enclosure, from a DHCP server for example. In especially preferred embodiment, multiple resource nodes share a common physical address, an Ethernet MAC address, when obtaining an address by using unique virtual physical addresses when communicating with the address server. For example, an enclosure can obtain multiple IP addresses from a DHCP server by using virtual physical addresses for each resource node in the "chaddr" field, the client address field, of the DHCP client request even though the module has a single real MAC address. This approach alleviates issues where a DHCP server does not correctly implement the DHCP client ID properly.

Disaggregated Resource Node Groups

A resource node comprises the ability to function independently of all other resource nodes and offers resource consumers access to the physical resource for which the resource node is responsible without regard to all other resource nodes composing the disaggregated resource. Consequently, resource nodes combine together forming different structures based on how a group as a whole is intended to function. In a preferred embodiment, there are four types of group structures, a group of one operating as a complete resource, a parallel group structure where resource nodes provide redundant resources, a serial group structure where resource nodes provide no redundancy, or a combination of parallel and serial groups. A single resource node that operates as a group of one providing a single complete resource is a trivial case and does not represent a disaggregated resource.

Figure 3A:
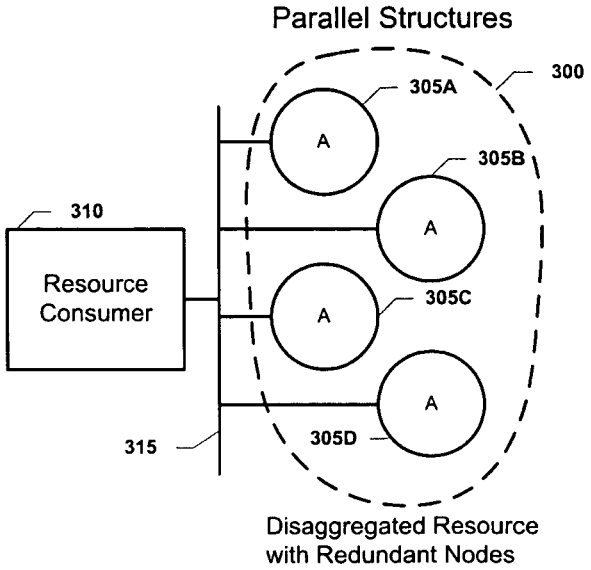
FIG. 3A is a schematic of an example of a parallel group of resource nodes composing a disaggregated resource.

FIG. 3A illustrates an example of a parallel group of four resource nodes. Disaggregated resource 300 comprises resource nodes 305A through 305D and represents a single resource from the perspective of resource consumer 310. Resource consumer 310 interacts with disaggregated resource 300 through communication path 315. Resource nodes 305A through 305D offer the same fundamental resource, resource "A," to resource consumer 310. Therefore, if one of resource nodes 305A through 305D disappears from view of resource consumer 310, resource consumer 310 still is able to fully utilize disaggregated resource 300 even though disaggregated resource 300 has lost a resource node because the remaining nodes offer redundancy. An example of a parallel group includes a data storage array employing a number of mirrored disks. If a disk fails, the other mirrored disks provide data due to redundancy. An additional example of a parallel group includes a video display comprising multiple monitors displaying the same video data. Should one monitor fail, the remaining monitors continue to provide the video data. In a preferred embodiment, a parallel group comprises two or more logical disk partitions that mirror data from another group of one or more logical disk partitions. Although FIG. 3A presents an example of four resource nodes, it is contemplated that a parallel group can comprise one or more resource nodes. It is further contemplated that a parallel group can comprise one or more other groups. Other contemplated parallel groups include archives or backups where data is stored for long term storage.

Figure 3B:
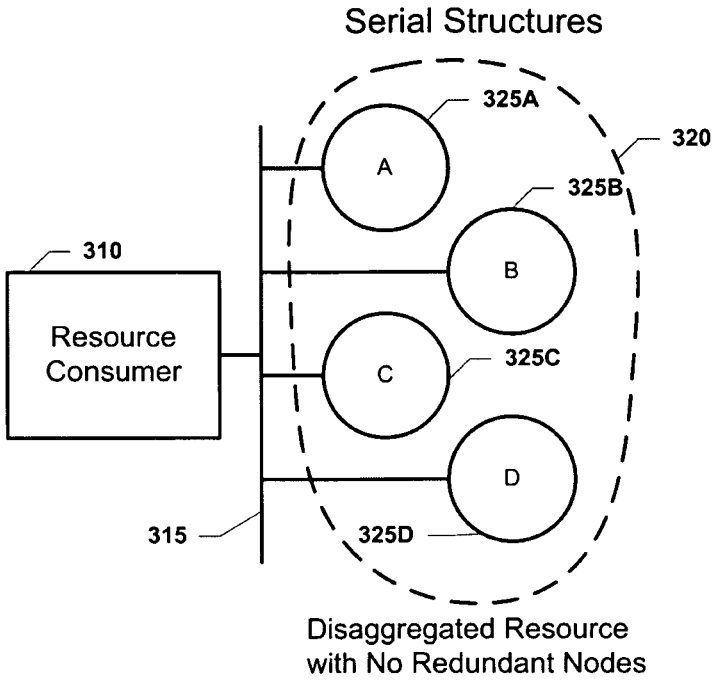
FIG. 3B is a schematic of an example of a serial group of resource nodes composing a disaggregated resource.

FIG. 3B illustrates an example of a serial group comprising four resource nodes. Disaggregated resource 320 comprises resource nodes 325A through 325D. Disaggregated resource 320 appears as a single resource to resource consumer 310. Resource consumer 310 communicates with disaggregated resource 320 over communication path 315. Resource node 325A through 325D each offer a single piece of a resource, "A" through "D" respectively, where resource consumer 310 requires resource "ABCD" to operate properly. Resource node 325A through 325D offers no redundancy; therefore, if one of the nodes disappears from view of resource consumer 310, disaggregate resource 320 would no longer be usable. Examples of serial groups for storage arrays include two or more disks comprising RAID-0 stripes or two or more disks where the disks are spanned together to offer larger capacity. If one disk fails, the storage array is rendered useless until the array is fixed. Other contemplated serial groups including a parity group, or an individual group where a parity group represents a group that comprises parity information and where an individual represents a group of a single resource node. An alternative example of a serial group includes a composite video display comprising two or more monitors that are combined into a single larger display. If one monitor fails, then the complete display is not useful because some video information is missing.

Figure 3C:
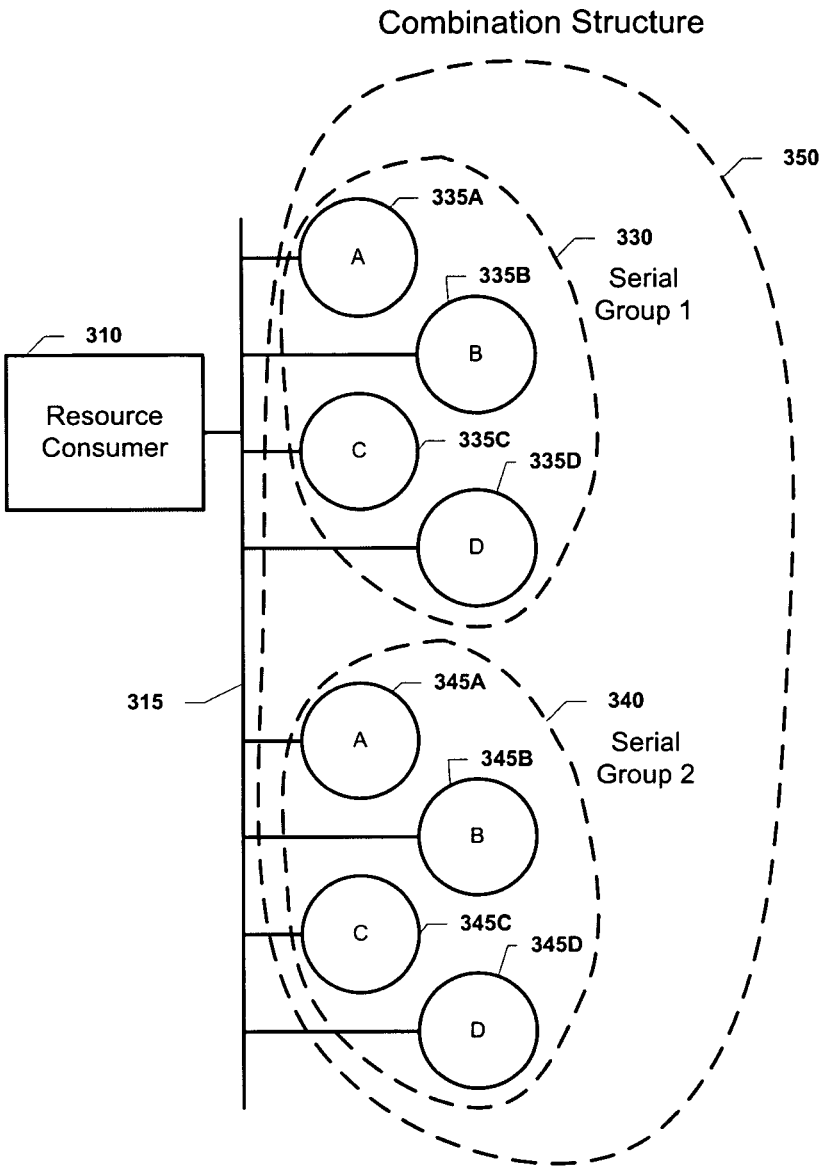
FIG. 3C is a schematic of an example of a combination group of serial and parallel groups of resource nodes composing a disaggregated resource.

FIG. 3C illustrates an example of a combination group comprising a parallel group of two redundant serial groups. Disaggregated resource 350 comprises serial group 330 and serial group 340, each offering the same resource "ABCD" to resource consumer 310. Resource consumer 310 communicates with disaggregated resource 350 over communication path 315. Resource nodes 335A through 335D provide access to resource "A" through "D" respectively as do resource nodes 345A through 345D. An example of a combination group includes a RAID 10 storage array where data is striped across multiple disks and those disks are mirrored. In a preferred embodiment, combination groups comprise two or more logical disk partitions. Furthermore, in a preferred embodiment combination groups comprise one or more other groups.

One or more resource nodes combine to form a group. One or more groups form an additional group. Finally, a disaggregated resource is a single top level group comprising one or more other groups. Groups become complex as resource nodes combine to offer various capabilities and services and because each resource node operates independently other nodes. Resource consumers require information to understand how resource nodes combine to form a disaggregated resource in order to properly interact with the disaggregated resource and to determine if the disaggregated resource has coherency.

In a preferred embodiment groups are classified by types where a type specifically references a role played by a collection of resource nodes. Furthermore, it is contemplated that resource consumers access a group collectively in addition to accessing individual resource nodes within the group. In the preferred embodiment, resource consumers access the group collectively through multicast messages.

Resource Node Information

Resource consumers obtain a view of a disaggregate resource based on information about resource nodes. Resource nodes are unaware of their role in a larger disaggregated resource because they focus on their main responsibility of providing access to a physical resource. Consequently each individual resource node lacks information about the complete disaggregated resource. Resource consumers obtain resource node information from each of the individual resource nodes and combine the information to form a description of the disaggregated resource in order to properly interact with it. In a preferred embodiment, resource node information resides within in a memory associated with the resource node; however, it is contemplated the resource node information can reside in alternative memories.

If a disaggregated resource comprises only a serial group, then a resource consumer only needs sufficient information to determine if the serial group has coherency. In other words, the resource consumer only needs to know if members of the group are missing. If the serial group does not have coherency (members of the serial group are missing), the disaggregated resource is not useable. Therefore, a resource consumer does not need complete information, i.e. information about which members are missing, but rather sufficient information indicating that members are missing. Furthermore, if a disaggregated resource comprises parallel groups, the resource consumer only requires sufficient information to determine if, through the redundancy of the parallel groups, the disaggregated resource is usable. Again, the resource consumer only needs sufficient information rather the complete information regarding the disaggregated resource.

Resource node information comprises elements that include the group type of a group of which a resource node is a member, resource node attributes, resource name, resource node name, resource node address, or other information desired by resource consumers to determine the coherency of a disaggregated resource. Resource consumers also use resource node information to determine the role of each resource node. If a resource consumer knows the role of a resource node, then the resource consumers is able to partially assist the resource node by performing operation in anticipation of passing resource requests to a resource node. For example, if a resource node represents a RAID-0 stripe, a resource consumer could perform necessary modulo arithmetic based on an LBA to determine if the stripe should receive a specific data block.

Group Types

Resource nodes combine together to form groups of different types. Each type of group represents a desired functionality, capability, or service. A group type provides resource consumers partial information regarding the role a group plays in the disaggregated resource.

Figure 4A:
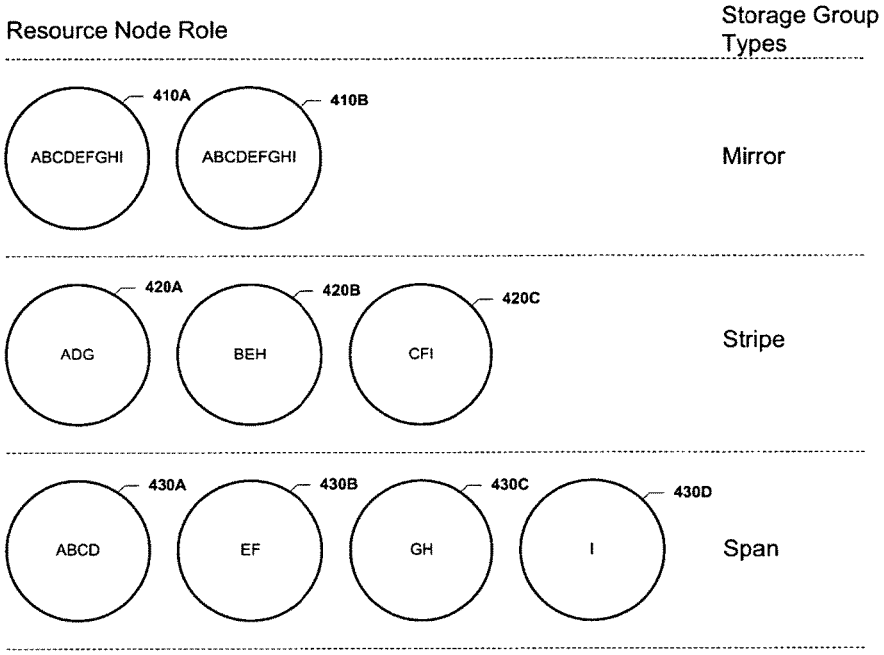
FIG. 4A is a schematic of an example of group types for a disaggregated storage array.

FIG. 4A presents a set of possible group types for resource nodes composing a disaggregated storage array. The resource nodes are logical disk partitions in this example. Assume the storage array comprises a data set of sequential data blocks "ABCDEFGHI" that could represent a single file. The resource map of each logical disk partition determines for which data blocks the logical partition is responsible. Logical disk partitions 410A and 410B are mirrors because they both are responsible for identical data and provide redundancy; therefore, each logical disk partition has a "mirror" group type. One should note that each logical disk partition is a group of one node in the example shown. Mirror groups are a form of parallel group and have resource that is redundant to another group. Logical disk partitions 420A through 420C represent a stripe group where individual data blocks are written across logical disk partitions 420A through 420C sequentially, then wrap around. Logical disk partitions 430A through 430B represent a span group where data fills one logical disk partition then flows over to the next logical disk partition. Both a stripe group and a span group are serial groups. In a preferred embodiment, contemplated group types include mirrors, stripes, or spans. In especially preferred embodiments, contemplated mirror sub-types include snap-shots, backups, or deferred mirrors; contemplated stripe sub-types include parity. Snap-shots are a type of mirror group that captures a dataset at a specific point in time. Backups are a type of mirror group that archives a data set. Deferred mirrors are a type of mirror that has an I/O latency with respect to a primary group. Parity is a type of stripe comprising parity information. Parity groups are useful when implementing RAID-3, 4, 5, 6, or other storage arrays that require parity.

Figure 4B:
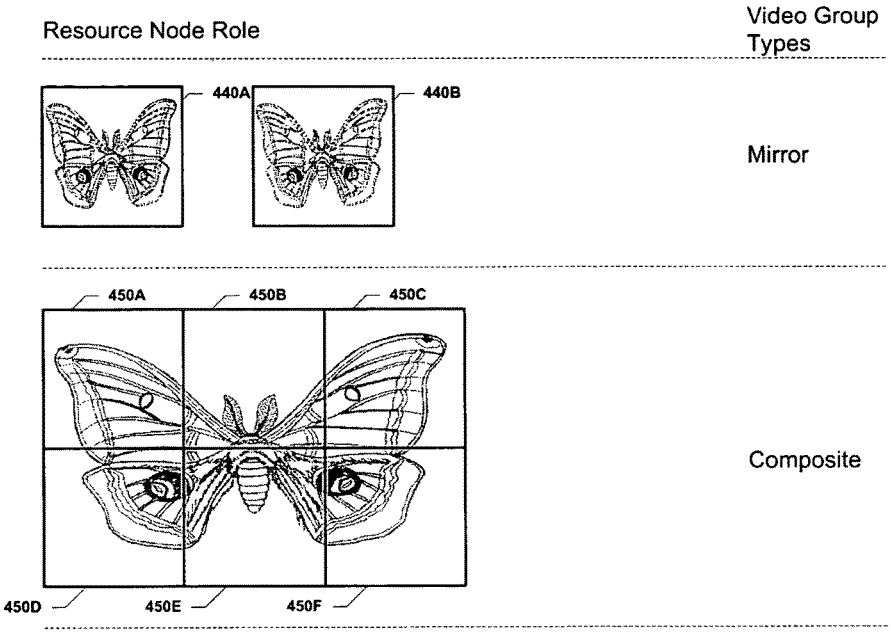
FIG. 4B is a schematic of an example of group types for a disaggregated video display.

FIG. 4B presents another example of a set of possible group types for resource nodes composing a disaggregated video display. The resource nodes are logical video frames in this example. Logical video frames 440A and 440B represent mirror groups where the same data is displayed on the two logical frames. Logical video frames 450A through 450F compose a composite display and are therefore a composite group. One should note the logical video frames 440A through 440F do not have to be located on the same monitor or have to be located physically close to each other.

The purpose of the previous examples is to illustrate that group types are created based on the type of disaggregated resource. In addition, there are common group types regardless of the type of disaggregated resource, mirrors for example. Composite types are essentially a combination of span and stripe.

Groups can become quite complex depending on how the different group types combine to form a disaggregated resource. In a preferred embodiment groups are organized according to rules for manageability providing resource consumers structure so they can determine how groups should fit together and what role each group takes on. In a preferred embodiment, group types are hierarchically organized. For example in storage arrays it is contemplated that mirror groups are the top most group because each mirror represents one data set. The next level comprises stripe groups that provide performance enhancement, and then at the lowest level are span groups that provide capacity enhancement. It is contemplated that group type information is encoded in a memory. In a preferred embodiment, the group type information combines with a resource node name. In an especially preferred embodiment, group types also represent results of operations performed on other groups. For example in a disaggregated storage array, if a stripe group of logical disk partitions has a "mirror operation" performed on it, the result is a mirror group comprising two stripe groups, the original stripe group and a new stripe group.

Resource Node Names

Resource node names provide one or more pieces of information to remote consumers including identification or group membership information, logical position information within a disaggregated resource, partial role information, or other information that a resource consumer might need to access a disaggregated resource.

Identification and membership information allows a resource node to uniquely identify itself with respect to other resource nodes whether they are in the same disaggregated resource or from other disaggregated resources. Resource consumers can resolve the resource node name to an address which allows the resource consumer to communicate directly with a specific resource node. Resource node names and addresses ensure each resource node is distinguishable from other resource nodes. In a preferred embodiment, a resource node comprises the name of the disaggregated resource. In an especially preferred embodiment, a resource node name comprises a unique identifier including a UUID or a GUID. In addition, a resource node name of a preferred embodiment resolves to an internetworking address including a unicast address or a multicast address.

In a preferred embodiment, a resource node name comprises position information that informs a resource consumer where in a disaggregated resource a resource node fits. In an especially preferred embodiment the position information comprise a group type. Therefore, a resource node name carries partial resource node role information.

Figure 5A:
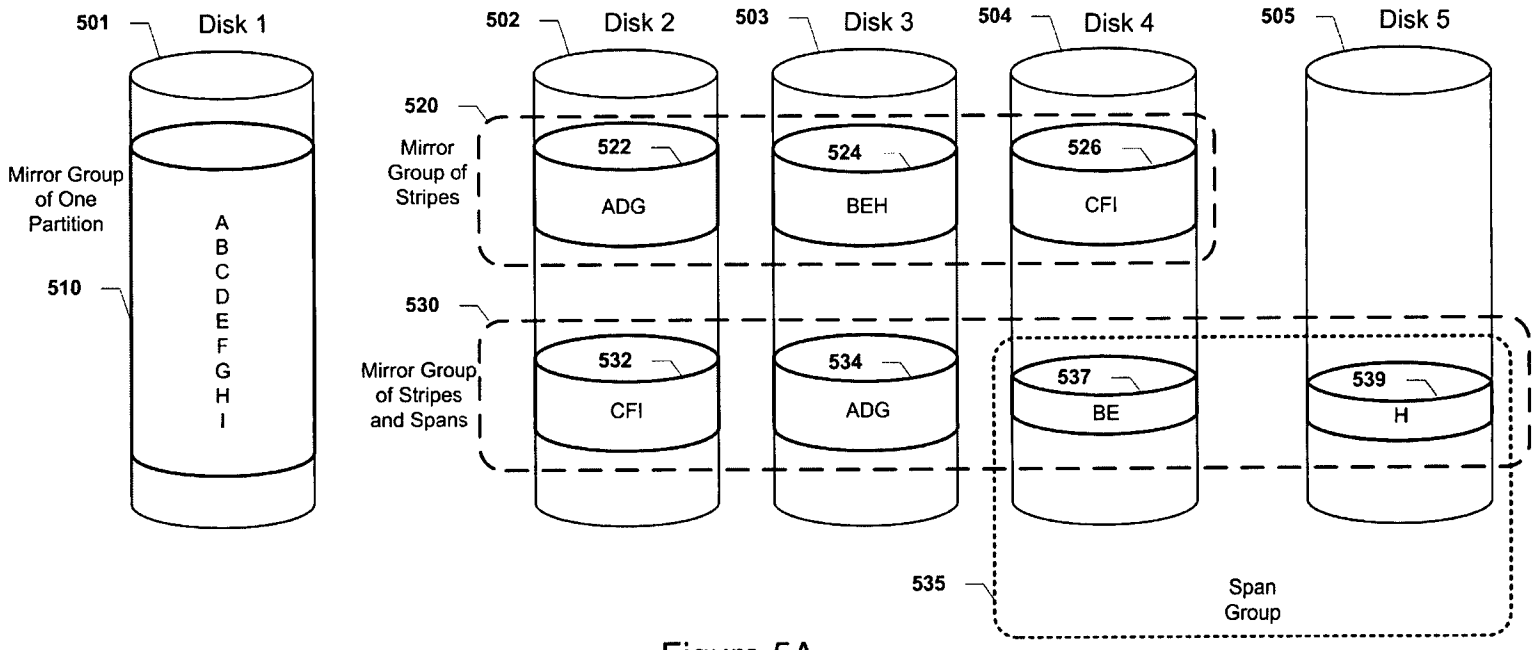
FIG. 5A is a schematic for an example of a physical arrangement of logical disk partitions composing a disaggregated storage array representing a logical volume Z.
Figure 5B:
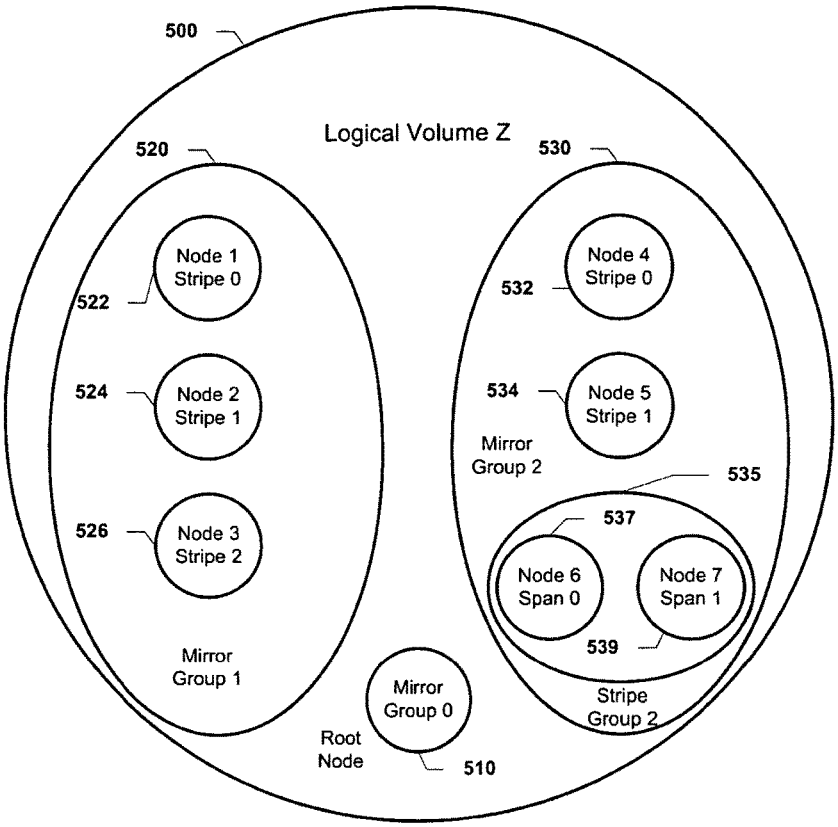
FIG. 5B is a schematic for an example of the logical organization of logical disk partitions composing a disaggregate storage array representing the logical volume Z of FIG. 5A.

FIG. 5A provides an example of a physical structure of a possible disaggregated storage array comprising a number of resource nodes where the resource nodes are logical disk partitions. The example is provided to clarify how resource consumers can utilize resource node names. A resource consumer operates on data set comprising data blocks "ABCDEFGHI" stored on disks 501 through 505. The storage array comprises three complete, redundant data sets for reliability. Each disk comprises one or more partitions controlled by a resource node that represents each partition as an addressable, logical disk partition. Resource node 510 is a mirror partition comprising the complete data and is; therefore, a mirror group of one resource node. Mirror group 520 also comprises the complete data stored on three striped resource nodes 522, 524, and 526. Mirror group 530 also comprises the complete data set stored on two striped resource nodes 532 and 534 and span group 535 that functions as a third stripe. Span group 535 comprises resource nodes 537 and 539. From the perspective of a resource consumer, this collection of resource nodes appears as a single logical volume that stores data set "ABCDEFGHI." The resource consumer attempts to make sense of the structure through each resource node's name. FIG. 5B presents a logical representation of the same disaggregated resource of FIG. 5A assuming groups are organized hierarchically as follows from top to bottom: mirrors, stripes, and spans. Logical volume 500 comprises the groups to form a single disaggregate resource.

Given the example hierarchical structure illustrated in FIG. 5B, Table 1 lists a possible name associated with the eight nodes composing logical volume 500. Table 1 assumes logical volume 500 has name "Z" and that mirror groups are designated by the letter "M" and a number. In addition, stripe groups are designated by the letter "R" and a number. "R" is used in the example to reflect stripes are a RAID 0 group. Span groups are designated by the letter "S."

TABLE 1

Resource Node Names for Example Storage Structure Logical Volume 500 in FIG. 5B

| Resource Node | Example Name |
|---|---|
| Root Node 510 | Z |
| Resource Node 522 | Z.M1 |
| Resource Node 524 | Z.M1.R1 |
| Resource Node 526 | Z.M1.R2 |
| Resource Node 532 | Z.M2 |
| Resource Node 534 | Z.M2.R1 |
| Resource Node 537 | Z.M2.R2 |
| Resource Node 539 | Z.M2.R2.S1 |

Resource node names form two different classes: those that provide resource node role information and those that do not. Resource node role information helps resource consumers determine how to properly interact with individual resource nodes. For example in the case of a mirror group 520, resource nodes 522, 524, and 526 are striped nodes. A resource consumer can infer through the names of resource nodes 522, 524, and 526 are each stripes. Therefore, based on knowledge of how stripes operate (stripe depth, LBA ranges, module arithmetic, or other information), a resource consumer can determine which resource node is responsible for individual LBAs in a logical volume. Consequently, the resource consumer performs LBA calculations locally to determine which resource node is responsible for an LBA, then directly interacts with an individual resource node. In a preferred embodiment, the interaction is through a unicast message directed from the resource consumer to the address of a resource node. If resource nodes handle LBA calculations, then resource node names only have to carry organization information and do not have to carry resource node role information. In this case, a resource consumer directly interacts with the entire group collectively and lets each member of a group determine if any action is required on their part. For example, a resource consumer interacting with mirror group 520 sends a single message comprising an LBA to resource nodes 522, 524, and 526 collectively. In a preferred embodiment, the interaction is through a multicast message directed from the resource consumer to the multicast address of the group. Given this case, developers can use any naming or tagging system that results in a discernable structure for a disaggregated resource and is understandable by a resource consumer.

Through structured naming, resource consumers determine the overall structure of a disaggregated resource and identify gaps in the structure. For example, if resource node 524 does not respond to a discovery request by a resource consumer, the resource consumer understands there is a gap between resource node 522 with name "Z.M1" and resource node 526 with name "Z.M1.R2." Therefore, the resource consumer has sufficient information to determine that mirror group 520 (as serial group of striped resource nodes) is incomplete and can not be used. However, given a structured naming scheme, a resource consumer can not know the last member in a group because it is always possible that the last resource node might not have responded. For example, if resource node 526 of mirror group 520 does not respond to a discovery request, the resource consumer would believe that resource node 524 is the last member of mirror group 520 and would not know that group is incomplete. It is contemplated that resource node names carry complete information regarding group memberships so that resource consumers can make a full determination of disaggregated resource coherency; however, such naming is inefficient because names can become long, disorganized, or unmanageable. It is also contemplated that resource node names have additional characteristics including being discoverable via discovery request message, or comprise information regarding resource node responsibilities.

Resource node names form two different classes: those that provide resource node role information and those that do not. Resource node role information helps resource consumers determine how to properly interact with individual resource nodes. For example in the case of a mirror group 520, resource nodes 522, 524, and 526 are striped nodes. A resource consumer can infer through the names of resource nodes 522, 524, and 526 are each stripes. Therefore, based on knowledge of how stripes operate (stripe depth, LBA ranges, module arithmetic, or other information), a resource consumer can determine which resource node is responsible for individual LBAs in a logical volume. Consequently, the resource consumer performs LBA calculations locally to determine which resource node is responsible for an LBA, then directly interacts with an individual resource node. In a preferred embodiment, the interaction is through a unicast message directed from the resource consumer to the address of a resource node. If resource nodes handle LBA calculations, then resource node names only have to carry organization information and do not have to carry resource node role information. In this case, a resource consumer directly interacts with the entire group collectively and lets each member of a group determine if any action is required on their part. For example, a resource consumer interacting with mirror group 520 sends a single message comprising an LBA to resource nodes 522, 524, and 526 collectively. It a preferred embodiment, the interaction is through a multicast message directed from the resource consumer to the multicast address of the group. Given this case, developers can use any naming or tagging system that results in a discernable structure for a disaggregated resource and is understandable by a resource consumer.

Resource Node Attributes

Resource node attributes contribute to determining the role of a resource node, to determining the coherency of the disaggregated resource, or to helping a resource consumer to properly interact with a disaggregated resource.

Resource consumers use resource node attributes to determine if a serial group of resource nodes is complete or has coherency. It is contemplated that resource nodes have coherency attributes where each attribute is associated with a group type. For example, in a storage array representing a disaggregated resource with mirror groups, stripe groups, and span groups, coherency attributes could include a mirror attribute, a stripe attribute, and span attribute. In a preferred embodiment, each coherency attribute indicates that there are additional members, and therefore, nodes, associated with a particular group. Table 2 illustrates how coherency attributes contribute to a resource consumer's understanding of a disaggregated resource structure and the roles each node plays in the disaggregated resource based on logical volume 500 example presented in FIG. 5B. In Table 2, the "M" attribute indicates that there is an additional mirror group; the "R" attribute indicates that there is an additional stripe member, and the "S" indicates there is an additional span member. Even though the attributes are set on the individual nodes, the attributes are associated with the groups because groups can comprise other groups that further comprise multiple resource nodes, for example mirror group 530 comprising span group 535 which functions as a stripe.

TABLE 2

Resource Node Names and Attributes for Example Storage Structure Logical Volume 500 in FIG. 5B

| Resource Node | Example Name | Attributes M | R | S |
|---|---|---|---|---|
| Root Node 510 | Z | Y | N | N |
| Resource Node 522 | Z.M1 | Y | Y | N |
| Resource Node 524 | Z.M1.R1 | Y | Y | N |
| Resource Node 526 | Z.M1.R2 | Y | N | N |
| Resource Node 532 | Z.M2 | N | Y | N |
| Resource Node 534 | Z.M2.R1 | N | Y | N |
| Resource Node 537 | Z.M2.R2 | N | N | Y |
| Resource Node 539 | Z.M2.R2.S1 | N | N | N |

A resource consumer interacting with logical volume 500 with attributes has sufficient information to determine if the serial groups comprising logical volume 500 have coherency and are complete. For example, the resource consumer can determine the completeness of mirror group 520, a serial group comprising striped resource nodes 522, 524, and 526, by checking the attributes even if a resource node is not visible. If resource node 526 is not visible to the resource consumer, then the resource consumer can determine that there are additional expected groups based on the "R" attribute being set on resource node 524. Furthermore, if all members of mirror group 520 are visible to the resource consumer, then the resource consumer can determine that there are no additional members because the "R" attribute is not set on resource node 526 indicating there are no additional stripes and, therefore, can determine that the group is complete.

The attributes also contribute information that allows a resource consumer to infer what role a resource node plays in the disaggregated resource. For example, resource node 522 has the name "Z.M1" which partially indicates its role, that it is a mirror. However, the name does not contain information regarding its role as a stripe. The resource consumer can infer that resource node 522 is stripe by detecting that the "R" attribute is set indicating that an additional stripe is expected implying resource node 522 is also a stripe.

Maintaining coherency of parallel groups requires more complex attributes because if one member of the parallel group is not visible, other resource nodes that are redundant can supply the resource in place of the lost group member. Coherency is important when multiple resource consumers access a shared disaggregated resource where the physical resource has state from the perspective of the resource consumers. Due to a number of reasons including unreliable networks, a resource consumer could lose track of a resource node in a parallel structure; consequently, that node could become out of synch with other resource nodes even though the complete disaggregated resource still provides functionality from the perspective of the resource consumer due to redundancy. For example, logical volume 500 is a parallel group comprising three mirror groups, root node 510, mirror group 520 (a serial group of striped resource nodes), and mirror group 530 (a serial group of striped and spanned resource nodes) all comprising identical data sets. If a first resource consumer can see only mirror groups 520 and 530, but not 510, then it could properly interact with the two visible groups. However, if a second resource consumer can see only mirror group 510, but not 530 and 520, then the second resource consumer can properly interact with group 510. Unfortunately, data on logical volume 500 is at risk if both resource consumers write to the volume because the volume no longer has coherency resulting in the groups losing synchronization. Coherency attributes can include a count of the number of groups or resource nodes comprising a parallel group. In the case of logical volume 500, there are three parallel groups supplying redundant data: therefore the member count is three. Furthermore, a resource consumer, upon detection that a group or node is missing, can change a valid count on the visible resource nodes to indicate how many groups are valid. For example, in the case of the first resource consumer seeing only mirror group 520 and 530 would set a valid count to two (as opposed to three). Any other resource consumer would see a discrepancy between the valid count (2) and member count (3) and know the disaggregated resource has lost coherency.

In a preferred embodiment, resource nodes have both a resource valid attribute indicating how many members of a group are valid and a resource member attribute indicating the number of expected members in the disaggregated resource. In a more preferred embodiment, resource nodes comprise a key to ensure that only one resource consumer is able to modify resource attributes at a time, or to indicate when group member resource node attributes are modified. Contemplated keys include random numbers, sequential counts, UUID, or GUIDs. Additionally, in a preferred embodiment resource consumers periodically check the coherency of a disaggregated resource to ensure it is able to services resource requests.

In a preferred embodiment, through an advantageous selection of rules for creating an organizational structure of resource nodes, only one attribute is required for each group type rather than an attribute for each created group.

Additional resource node attributes are also contemplated. Specifically, attributes that indicate whether resource nodes are owned or share provide utility when multiple resource consumers interact with a disaggregated resource simultaneously.

Other Resource Node Information

Beyond group types, resource node names, and resource attributes, additional resource node information is contemplated including resource node capabilities, physical resource information, detailed resource node resource map information, or other information that enhances the operation of a disaggregated resource with respect to a resource consumer. Examples of resource node capabilities within storage array include block size, stripe size, logical partition capacity, or LBA responsibility information. Examples of resource node capabilities within a disaggregated video display include logical video frame size, pixel color depth, decoding information, or aspect ratio. All information regarding a resource node is contemplated.

Resource Maps

Resource maps provide a translation from a resource element ID, an LBA or logical pixel coordinate for example, to a physical address, a hard disk storage block or a pixel on a video monitor for example. Within this context "physical address" means an address that is directed toward a physical resource; therefore a physical address includes intermediary addresses that are further directed toward the physical resource. Resource maps, especially those located within a resource node determine a resource node's responsibility.

Resource maps are either static or dynamic. Static resource maps are stored in a memory and contain sufficient information for translation. Dynamic resource maps are also stored in a memory and are built based on resource node information. Resource consumers build a dynamic map, if necessary, and determine if the map is complete through the resource node information.

Figure 6:
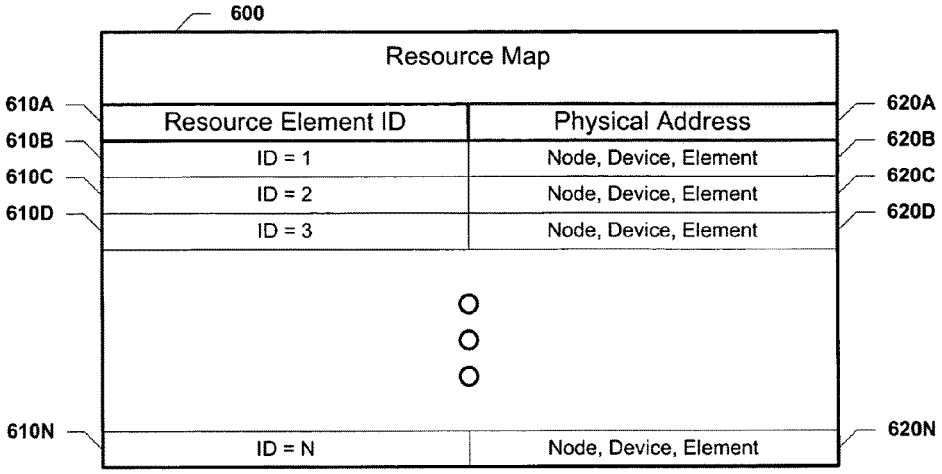
FIG. 6 is a schematic for a resource map.

FIG. 6 depicts an example of a resource map. Resource consumers access a disaggregated resource through the use of resource map 600 by referencing elements of the disaggregated resource via resource element IDs 610A through 610N. Resource map 600 includes a translation from resource element IDs 610A through 610N to physical addresses 620A through 620N. A resource map comprises a combination of software or data structures to achieve the goal of translation. It is contemplated that a resource map could comprise a table; however, the map would be an inefficient use of memory due to the number of resource elements IDs that have to be handled. In a storage array a typical number of IDs comprise $2^{48}$ LBAs. In a video display, the number of pixels could easily be in the millions. In a preferred embodiment, resource map 600 comprises a software function that translates resource element IDs 610A through 610N to physical addresses 620A through 620N. Consequently, resource maps provide a translation from a virtual coordinate system used to represent the disaggregated resource to a physical coordinate system across physical resources. A resource consumer collects resource node information from resource nodes that compose a disaggregated resource. The resource consumer then constructs a dynamic resource map in memory based on resource node names, resource node attributes, resource node addresses, or group types. If the resource consumer has an understanding of the roles of each resource node, then the resource consumer can have an understanding of how resource element ID 610A through 610N are distributed across all the resource nodes. In the example of a disaggregated storage array where data is striped across a number of resource nodes, a resource map takes the form of software function employing modulo arithmetic to determine which resource node is responsible for an LBA. The physical address in this case would be the address of the node responsible for the LBA. In a preferred embodiment, a resource element ID translates to one or more physical address in order to support parallel groups including mirrors.

The complete map of a disaggregated resource splits into a number of smaller maps; each of them also a resource map. Resource consumers need sufficient information to create a map that allows it to interact with the disaggregated resource. Resource nodes have a fine grained mapping of a physical resource which is often a static map.

Figure 7:
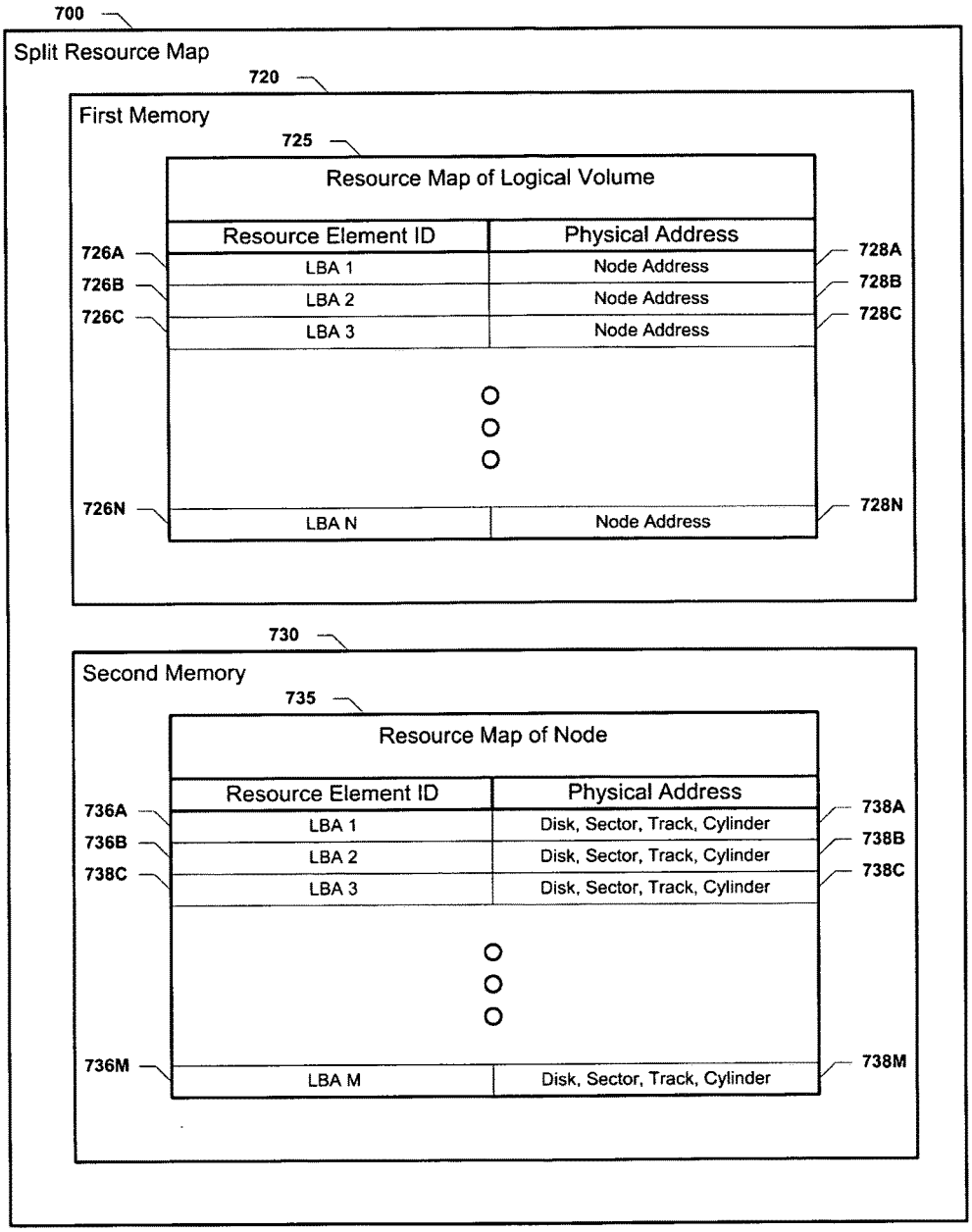
FIG. 7 is a schematic for a split resource map.

FIG. 7 depicts an example of a split resource map of disaggregated storage array. Split resource map 700 comprises resource sub-map 725 stored in first memory 720 and resource sub-map 735 stored in second memory 730. Resource sub-map 725 translates LBAs 726A through 726N to resource node addresses 728A through 728N. Resource sub-map 735 represents an example static resource map of a resource node addressed in resource sub-map 725. Resource sub-map further translates LBAs 736A through 736M to physical addresses 738A through 738M representing a physical location on a disk drive. Resource sub-map 725 and resource sub-map 735 do not have to have the same number of elements because a resource node's resource map generally represents a fraction of the complete disaggregated resource. A resource consumer interacting with the example storage array uses resource sub-map 725 to find an address of a resource node. Resource consumer sends requests to a specific resource node, if required. The specific resource node could then use a resource map similar to example resource sub-map 735 to interact with a disk. In a preferred embodiment, resource maps and resource sub-maps employ software functions for translation. In an especially preferred embodiment, the software functions are used to yield resource node responsibilities including striping, parity, spanning, mirroring, or composite responsibilities.

Each resource map in a disaggregated resource comprises a level of granularity. Resource consumers often utilize coarse grain resource maps with a granularity at the resource node level. The resource node level corresponds to a granularity at physical partition level that is at or below a physical resource level. For example, in a storage array, a resource node represents a logical disk partition that corresponds to a disk partition that is smaller than a disk drive. In addition, in a video monitor, a resource node represents a logical video frame that corresponds to a frame that is smaller than the video monitor.

Figure 8:
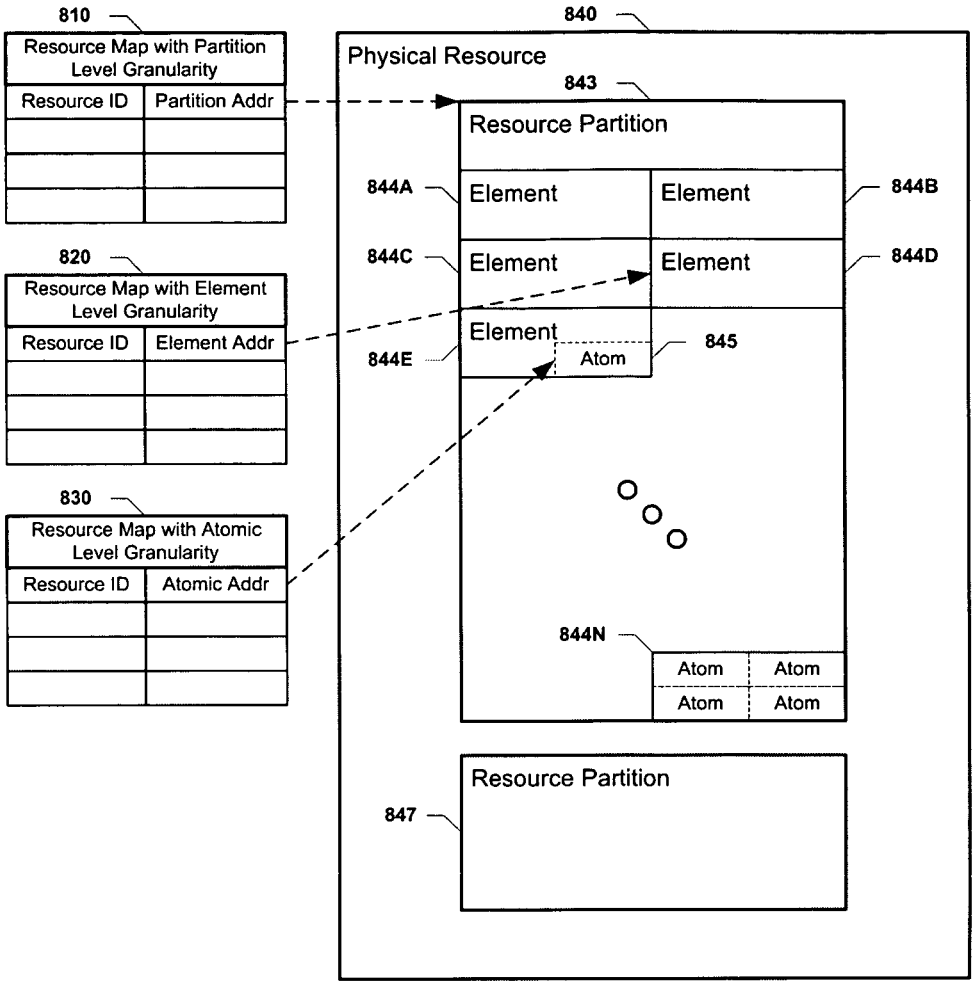
FIG. 8 illustrates resource maps with varying degrees of granularity.

FIG. 8 depicts several resource maps with various levels of granularity. Physical resource 840 comprises physical resource partition 843 and 847. A resource node is responsible for providing access to physical resource 840, and more particularly to resource partition 843. Resource map 810 has a granularity at the resource partition level because it translates resource element IDS to physical addresses that correspond to a physical resource partition level. In a preferred embodiment, the physical address of a physical resource partition corresponds to an address of a resource node. Physical resource partition 843 further comprises physical resource elements 844A through 844N. Resource map 820 has a granularity at the resource element level that is below the physical resource partition level because it can address individual physical resource elements 844A through 844N. Contemplated resource elements include addressable blocks on a disk drive. Resource nodes typically employ resource maps that have granularity at the physical resource element level. It is contemplated that a resource map can have a granularity below the physical resource element level. Physical resource elements 844A through 844N comprise smaller pieces as depicted by atom 845. For example, disk drives have addressable blocks where each block comprises a number of bytes and each byte comprises a number of bits. Resource map 830 has a granularity at the atomic level. It is contemplated that resource nodes that employ resource maps having an atomic level granularity or below use multiple operations to access the physical resource. In the case of a storage array, a resource node would use a read-modify-write operation to change a byte within a block.

Accessing Disaggregated Resources

Figure 9:
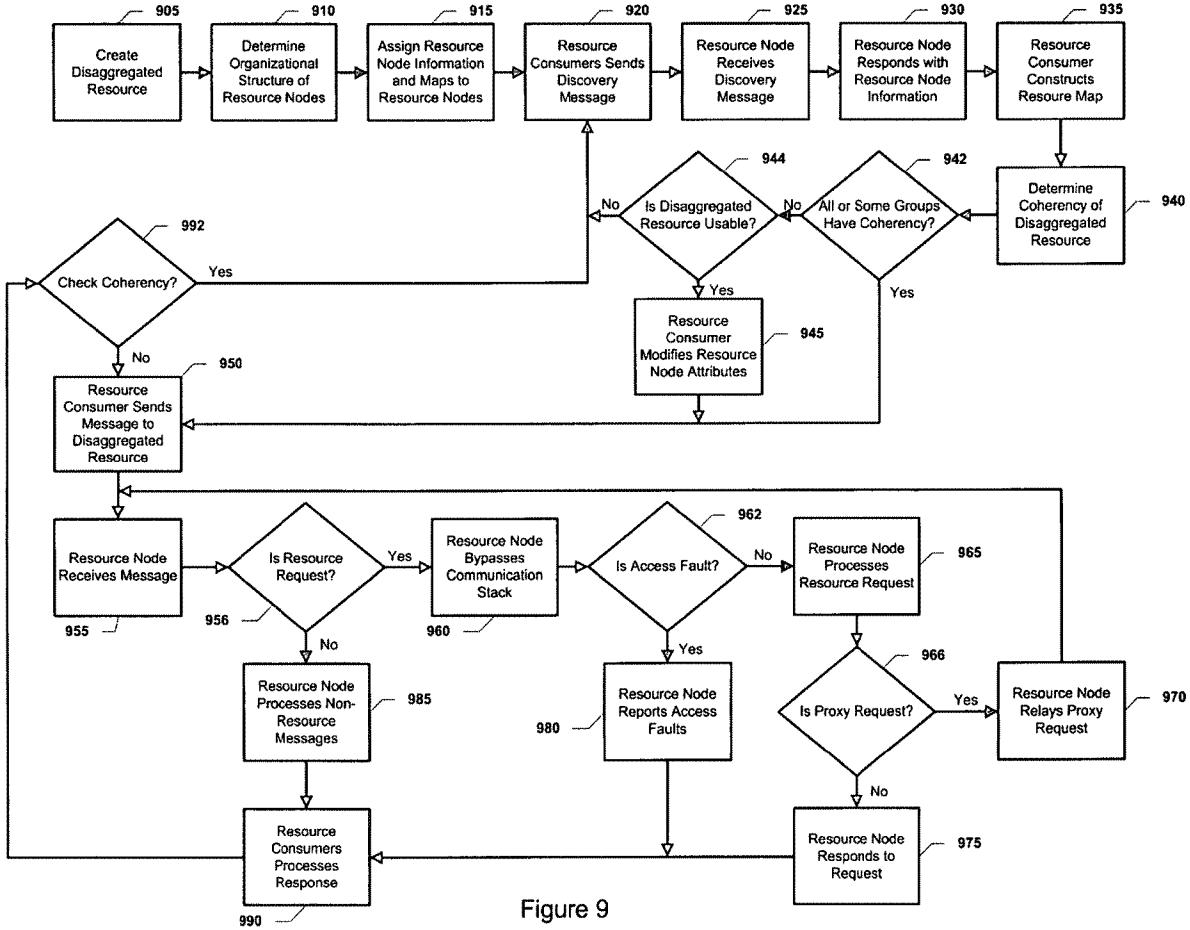
FIG. 9 is a schematic for an example method of accessing a disaggregated resource.

FIG. 9 depicts a possible set of steps by which entities can interact with disaggregated resources.

At step 905, a manager creates a disaggregated resource. The manager responds to a need for the disaggregated resource and creates two or more resources nodes that have responsibility for physical resources in order to attempt to fulfill the need. For example, an IT manager establishes that an enterprise requires several terabytes of disk storage comprising mirrored data. Then, through utilities, the manager creates a number of logical disk partitions (resource nodes) representing partitions on a set of disk drives where the collection of logical disk partitions substantially fulfills the capacity and mirroring requirements. In a preferred embodiment, the manager uses a one or more software utilities designed to communicate with resource consumers, resource nodes, or modules that connect to physical resources. Given this, it is contemplated that a manager includes an administrator, a software package used to manage disaggregated resources, management servers, or management appliances. It is further contemplated that a manger includes a resource consumer, or a computer system external to the resource consumer and disaggregated resource.

At step 910, the manager establishes an organizational structure for the resource nodes. The organization structure provides definitions for the roles and responsibilities of each resource node. Once the roles and responsibilities are established, a manager creates a corresponding set of resource node information and resource maps for deployment into the resource nodes. Resource consumers use knowledge of the rules for forming the organizational structure in order to convert resource node information in a useable map of the disaggregated resource or determine if the disaggregated resource has coherency. In a preferred embodiment, the organizational structure comprises a hierarchy based on group types. In an especially preferred embodiment, the hierarchy groups include mirrors, stripes, composites, or spans. Other contemplated hierarchical structures include trees, or directed graphs. Non-hierarchical structures are also contemplated including flat sequential lists with no preferred ordering of resource nodes.

At step 915, a manager assigns resource node information and resource maps to each of the resource nodes composing the newly created disaggregated resource. Each resource node receives the resource node information and the resource map information then stores the information in a memory. The resource node information provides resource consumers information regarding what role the resource node takes on in the disaggregated resource. The resource map determines the responsibility of the resource node. In a preferred embodiment, resource node information includes group types, resource name, resource node name, or resource node attributes. Once the resource nodes composing the disaggregated resource have their resource node information and resource maps initialized, resource consumers can begin accessing the disaggregated resource aware of the disaggregated resource, At step 920, a resource consumer wishes to access the disaggregated resource. If the resource consumer is not aware of the disaggregated resource, the resource consumer sends a discovery message to the disaggregated resource. Possible discovery methods include reading resource node from a local information store, sending broadcast message to resource nodes, using standardized protocols including SSDP, requesting resource node information from a server external to the disaggregated resource, or other methods that result in delivering resource node information to the resource consumer. In a preferred embodiment, discovery includes identifying the physical modules that comprise resource nodes and sending name resolution requests with possible regular expression information to all resource nodes. If a resource node receives the request and its name matches the regular expression, it will respond. Contemplated discovery requests include those sent via unicast to individual resource nodes, via multicast sent to groups of resource nodes, or via broadcasts sent to one or more groups of resource nodes.

At step 925, each resource node receives discovery messages sent by resource consumers. Upon reception and verification of authorization, if any authorization is required, of the discovery message, each individual resource node retrieves its own resource node information from its memory. The resource node information is formed in a response message which is sent back to the resource consumer at step 930. The resource consumer attempts to collect responses from all responding resource nodes. It is contemplated that not all resource nodes will respond. In a preferred embodiment, resource consumers have the ability to cycle through multiple discovery attempts to capture as much resource node information as possible given an unreliable network.

At step 935, the resource consumer collects resource node information from responding nodes and constructs a resource map of the disaggregated resource. The resource consumer has an understanding of the rules of the organizational structure used to create the resource node information. Based on the rules and on the resource node information the resource consumer can determine if the constructed resource map is sufficiently complete or if the disaggregated resource has coherency. If the resource map is sufficiently complete, then the disaggregated resource is usable by the resource consumer. A sufficiently complete resource map is still considered complete as long as some members of a parallel group are visible. For example, if a storage array comprises a number of mirrored groups, each being a member of a parallel group, then one mirror could disappear from view, but the storage array would still be useful. If coherency is lost, the disaggregated resource might not be useable as is the case when coherency is lost in a serial group. At step 940, the resource consumer assesses the constructed resource map and at step 942 it decides if the disaggregated resource has coherency. If the disaggregated resource has coherency, then the resource consumer can begin using the disaggregated resource at step 950. If the disaggregated resource does not have coherency, then the resource consumer determines if the resource map has sufficient group members to still be useable. In a preferred embodiment, the resource consumer checks resource node names, group type, or resource node attributes to check for coherency. Additionally, a preferred embodiment sorts the list of responding resource nodes, or removes duplicates, if any.

At step 944, the resource consumer decides if the remaining group members are able to provide sufficient capabilities to service requests from the resource consumer. This is possible in the case where there are sufficient parallel groups, or redundant resources. If there are sufficient capabilities remaining, the resource consumer will modify the resource node attributes at step 945 to indicate a change in coherency to be detected by other resource consumers. In a preferred embodiment, a resource consumer modifies coherency attributes including a resource node valid attribute. If the disaggregated resource is not usable, the resource consumer optionally reports an error or optionally attempts the discovery process again at step 920 to pick up lost members. It is contemplated that a resource consumer could probe for specific lost members based on detecting gaps within the map structure and on sending regular expression discovery messages tailored to check for names the could appear in the gaps. After modifying resource node attributes at step 945, the resource consumer can begin using the disaggregated resource at step 950.

At step 950, a resource consumer interacts with the disaggregated resource by sending messages to the disaggregated resource. In a preferred embodiment, sending messages comprises sending packets over a packet switched network to all the resource nodes, to groups of resource nodes, or to individual resource nodes that compose the disaggregated resource. In an especially preferred embodiment, communications between the resource consumer and disaggregated resource take the form of UDP packets that are broadcast, multicast, or unicast.

In a preferred embodiment a resource consumer employs optimization techniques when communicating with resource nodes over an unreliable communication path. Contemplated optimizations techniques including employing a slow start or congestion avoidance similar to TCP to ensure the communication path is solid. One factor that contributes to a communication path being unreliable is the physical nature of the infrastructure. For example, hubs, switches, or routers form a packet switched network that could represent an unreliable communication path. Not all networking equipment is the same nor does the equipment faithfully implement protocols or standards. Consequently, in an especially preferred embodiment where resource consumers use UDP to communicate with resource slow start or congestion avoidance ensures networking equipment is not overwhelmed due to speed of communications.

At step 955, all resource nodes that are capable of receiving messages from a resource consumer, accept the messages. Because resource consumers can broadcast a single message to a group of resource nodes, one or more resource nodes within a group can receive the message. Each individual resource node determines if the message requires their individual attention based on their role or responsibility as set forth by their resource node information or resource maps. For example, a message from a resource consumer can include a resource element ID which the resource node compares against its resource map. If a resource node determines that is should not take any action, the message is silently discarded. If the resource node determines it should take action on the message, it proceeds to analyze the message.

At step 956 a resource node determines if the resource consumer message is a request for a resource for which the resource node is responsible. If the message is a non-resource specific message, then message is handled appropriately at step 985 and a response is generated and sent if necessary, and resource consumers processes the response at step 990. Non-resource request messages include configuration messages, management messages, firmware updates, or other messages that are of interest to the resource node beyond a request for the resource. If the message is a resource request, the message is further analyzed.

At step 960 in a preferred embodiment a resource node bypasses a communication stack to deliver the message directly to the main functionality of the resource node in order to improve over-all performance of the resource node. It is contemplated that a resource node comprises a TCP/IP protocol stack that supports UDP packets. When a packet is accepted by the resource node at an Ethernet level, the resource node checks the packet and delivers the packet data directly the resource node application rather than requiring full processing of the TCP/IP stack eliminating superfluous computation. By bypassing the communication stack, costs are reduced because inexpensive processing units deliver more desirable performance than a more expensive, powerful unit that uses the full TCP/IP stack.

At step 962 the resource node checks the data in the resource request message to ensure that the resource node is able to handle the request or to determine if the request is an access fault. In a preferred embodiment resource request messages include one or more referenced (directly or indirectly) resource element IDS. The resource node checks its responsibilities to determine if it is able to handle the referenced resource element IDS. If some of the resource element IDS fall outside the scope of the resource node's responsibilities, then an access fault has occurred. The resource node reports the access fault back to the resource consumer and the resource consumer processes the response at step 990. In a preferred embodiment, au access fault shows a resource consumer that it is attempting to bridge resource nodes. For example, if two resource nodes form a span group in a storage array, when a resource consumer attempts write data for multiple LBAs, a bulk write, within a single message and the LBAs bridge from the first resource node to the second, the first resource node will generate an access fault. The resource consumer can then break the message up into individual requests each having a single LBA resulting in an aligned write to the resource nodes. If the message is not an access fault, the resource node continues its handling of the resource request.

At step 965 the resource node fully processes the resource request. The full processing depends on the type of resource for which the resource node is responsible. Contemplated processing includes, I/O processes, checking status, resource management, resource node information management, resource map management, or other processing as determined by the resource node's responsibilities or a protocol designed for use with the resource node.

In a preferred embodiment, it is contemplated that one type of processing that a resource node conducts is the processing of a proxy command at step 966. A proxy command instructs a resource node to communicate with another resource node as if the first resource node were a resource consumer. The first resource node then relays the message to the second resource node which is waiting at step 955.

At step 975 if the resource request is not a proxy command, the resource node continues processing the resource request and generates a response sent back to the resource consumer. The resource consumer receives the response at step 990.

It is contemplated that resource consumers and resource nodes communicate over an unreliable communication path that could result in loss of coherency of the disaggregated resource. Furthermore, multiple independent resource consumers access disaggregated resources simultaneously, each resource consumer having its own view of the disaggregated resource which could be out of synch with the other resource consumers. Therefore, in a preferred embodiment a resource consumer will periodically check for disaggregated resource coherency. At step 992 the resource consumer checks to see if coherency requires checking. If so, the resource consumer returns to step 920 and initiates a discovery. The periodicity of checking for coherency or conditions when coherency should be checked varies depending on the resource consumer and disaggregated resource environment. In a preferred embodiment, periodicities are greater than or equal to one second.

EXAMPLE DISAGGREGATED RESOURCES

The following examples illustrate how disaggregated resources can be employed to provide accessible resources for computer systems. Although a limited number of examples are presented, there are no implied restrictions or no implied limitations.

Example—Disaggregated Storage Array

An example of a disaggregated resource includes a data storage array comprising a plurality of hard disk drives. The storage array is virtualized by two or more resource nodes represented by logical disk partitions. Each logical disk partition has responsibility for a partition on a disk and comprises an IP address used to communicate with resource consumers. A logical disk partition also comprises a resource map that translates LBAs to physical disk locations used during I/O operations. The collection of logical disk partitions appears as a locally connect, logical volume to computer systems that represent resource consumers.

When the storage array is built, the logical disk partitions are created and given names that reflect their position and role in the group hierarchy of the logical volume. The group hierarchy includes groupings based on mirrors, stripes, or spans. The storage array represents itself as a single logical volume with a name. Each logical disk partition incorporates the logical volume name and group type information within the name of the logical disk partition. Furthermore, each logical disk partition also includes attributes indicating if there are more logical disk partitions in each type of group.

A resource consumer in the form of a software driver installs on a workstation beneath an operating system or file system. The low level placement of the driver allows existing software and applications to utilize the storage array without requiring modification. As software accesses the logical volume, the driver encapsulates I/O requests into a packets sent to the logical volume. In a preferred embodiment, the requests are sent to the logical volume collectively through a multicast message where the logical partitions composing the logical volume are all members of the multicast group. It is contemplated that the driver communicates with the logical volume through unicast messages as well.

The driver sends a discovery request to the logical volume and the logical disk partitions respond with their individual information including their names or attributes. Once the driver collects the resource node information, it builds the initial coarse grained map of the logical volume where the map comprises the roles each logical partition plays and the addresses of the logical partitions. Once the map is assembled and determined to be complete, the driver begins communicating directly with logical volume. If the map is incomplete as determined based on the names and attributes, the driver attempts to find missing elements or possibly generates errors. If the logical volume comprises mirrors, the driver is able to determine that a group of partitions could have lost coherency with the rest of the data set by detecting changes in the coherency attributes including the resource node valid attribute.

The driver sends read and write requests to the logical volume or to individual logical partitions. As the logical disk partitions receive the requests, each logical disk partition checks the LBAs of the requests and compare the LBAs to the logical disk partition's map of the disk partition to determine if action is required. If no action is required, the logical disk partition silently discards the packet; otherwise, the packet is processed.

In a preferred embodiment, logical disk partitions employ several optimizations. Packets from the driver can bypass the logical disk partition's communication stack to improve performance. In addition, packets are checked for access faults and the faults are reported back to the driver. The driver interprets the access fault as instructions to break requests up so individual logical disk partitions process the requests naturally without requiring logical disk partitions to communicate with each. Other interpretations of access faults are also contemplated in order to properly handle or report error conditions.

It is specifically contemplated that the data storage array uses modules attached to disk where the modules provide the logical disk partition functionality. Modules include rack mount enclosures that house 12 or 16 disks, desktop enclosures housing one to eight disks, single adapters that plug onto disks, or embedded modules integrated with other products.

Example—Disaggregated Video Display

Yet another example of a disaggregated resource includes a video display comprising a plurality of monitors. The video display is virtualized by two or more resource nodes represented by logical video frames where each logical video frame has an address and an extent of pixels, mostly likely in an (x,y) coordinate system. A logical video frame comprises a map that translates a virtual pixel address into a physical pixel address on one of the monitors. The collection of logical video frames appears as a locally connected video display from the perspective of an electrical device. Contemplated electrical devices include computers, TVs, video games, ATM machines, or other devices requiring a display.

The groups employed by the video display including composites groups where multiple logical video frames combine to form an aggregate display or mirror groups where the same video information is displayed more than once. It is contemplated a mirror includes a video recorder. The logical video frames also have names associated with their group types and the name of the video display. Coherency checks for the video display are useful to determine if a monitor has failed.

Just as in the storage example, a resource consumer for the video display can take the form of a driver. Furthermore, it is contemplated that a module comprising hardware, software, or firmware plugs into a video out of an electrical device and communicates with the video display transparently to the electrical device. For video streams, it is contemplated that image decoding can occur within the resource consumer, a third system, or within the logical video frame. Image decoding is required to determine which pixels of the image display should be mapped to which logical video frame and to provide for proper scaling for pixels.

Alternative Embodiments

In addition to the preceding examples alternative embodiments are also contemplated. Alternative embodiments include other computing related resources including processors where the processor bandwidth is treated as a resource, memory where memory is segmented into partitions similar to a storage array, networking interfaces where QoS or bandwidth is treated as a resource, power supplies, audio I/O, input devices, or others. Alternative embodiments also include non-computing resources including products supplied through a distribution system where a number of warehouses represent resource nodes.

It is also contemplated that more than one disaggregated resource can combine to form a larger heterogeneous resource. For example, several disaggregated resources including a storage array, video display, or processing array combine to form a disaggregated computer.

Hardware

In yet another aspect, it is contemplated that one could create hardware designed to adapt devices to allow the devices to function as an independent resource node, or in a more preferred embodiment, to function as multiple independent resource nodes where each resource node is responsible for a logical partition of the device. Therefore, the inventive subject matter includes hardware or firmware of such adapters as well as licensing, selling, advertising, managing, distributing, or operating the adapters.

Software

In still another aspect, it is contemplated that one could write software that would configure, simulate, or manage disaggregated resources and their associated infrastructure. From that perspective the inventive subject matter includes methods of writing such software, recording the software on a machine readable form, licensing, selling, distributing, installing, or operating such software on suitable hardware. Moreover, the software per se is deemed to fall within the scope of the inventive subject matter.

Advantages

Disaggregated resources provide a number of advantages. Individual resource nodes composing the disaggregated resource function independently of all other resource nodes which increases responsiveness or performance from the perspective of a resource consumer without requiring out-of-band communication. Each resource node provides partial information regarding the over map of the disaggregated resource allowing each resource consumer that requires access to the disaggregated resource to build its own effective map. This allows two resource consumers to share the same physical resources, or even the same logical resource, but access the disaggregated resources differently as required by their individual needs. For example, a first resource consumer could access one mirror group preferentially over another mirror group to reduce conflicts with the second resource consumer. Resource consumers are able to discover and access the disaggregated resource without working through an extraneous system that would incur cost overhead to a consumer. Finally disaggregated resources place resource map information with required granularity where it is necessary to ensure efficient access. Furthermore, the disaggregated resource can comprise resource maps with very fine levels of granularity offering a high degree of control over physical resources.

Thus, specific compositions and methods of disaggregated resources have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method comprising:

transmitting, *by a resource consumer device,* a discovery request to each of a plurality of resource nodes that each have a unique Internet protocol address and, collectively, present a logical representation of a plurality of physical resources;

receiving, *by the resource consumer device* from one or more resource nodes of the plurality of resource nodes, node information that includes a name for each of the one or more resource nodes; [and]

determining, *by the resource consumer device* from the names of each of the one or more resource nodes, an organizational structure of the plurality of resource nodes, the organizational structure being a parallel structure that will provide [a] *the* resource consumer *device* with access to a first data block of a data set stored on the plurality of physical resources through at least two resource nodes, or a serial structure that will provide the resource consumer *device* with access to the first data block through a first resource node and access to a second data block, which is consecutive with the first data block, of the data set through a second resource node*;*

*generating, by the resource consumer device, a resource map based at least in part on the organizational structure, the resource map indicative of translations used by processors of the resource nodes to determine if any action is required in response to access request communications received by the processors, the translations between logical resource element identifiers and physical addresses;*

*generating, by the resource consumer device, a message to one or more of the resource nodes based on the resource map; and*

*transmitting the message to the one or more resource nodes.*

2. The method of claim 1, wherein the one or more resource nodes is less than the plurality of resource nodes.

3. The method of claim 1, further comprising:

determining a coherency of a disaggregated resource that includes the plurality of resource nodes based at least in part on the node information received from the one or more resource nodes.

4. The method of claim 3, wherein the node information includes a name for each of the one or more resource nodes, and said determining a coherency of the disaggregated resource is based at least in part on the names of each of the one or more resource nodes.

5. The method of claim 4, wherein the node information further includes a coherency attribute and said determining the coherency of the disaggregated resource is further based at least in part on the coherency attribute.

6. The method of claim 5, wherein the organizational structure of the plurality of resource nodes includes a sequence of the plurality of resource nodes and the coherency attribute of a resource node of the one or more resource nodes is indicative of an additional resource node of the plurality of resource nodes that is later in the sequence.

7. The method of claim 1, further comprising:

generating, *by one of the processors,* a resource map to [correspond] *correlate* one or more *of the* logical resource element identifiers to each of the plurality of resource nodes.

*8. The method of claim 1, wherein the resource consumer device comprises a resource manager device.*

*9. A method, comprising:*

*receiving, at a resource consumer device, node names corresponding to one or more of a plurality of resource nodes;*

*determining, using the resource consumer device, an organizational structure of the plurality of resource nodes based on the node names, the organizational structure being a parallel structure that enables access to a data set through at least two of the plurality of resource nodes or a serial structure that enables access to a first data block of the data set through a first resource node and to a second data block consecutive to the first data block of the data set through a second resource node;*

*generating, using the resource consumer device, a resource map based at least in part on the organizational structure, the resource map indicative of translations used by processors of the resource nodes to determine if any action is required in response to access request communications received by the processors, the translations between logical resource element identifiers and physical addresses;*

*generating, using the resource consumer device, a message to one or more of the resource nodes based on the resource map; and*

*transmitting the message to the one or more resource nodes.*

*10. The method of claim 9, further comprising:*

*determining, using the resource consumer device, a coherency of a disaggregated resource that includes the plurality of resource nodes based at least in part on the node names received from the one or more of the plurality of resource nodes.*

*11. The method of claim 10, further comprising:*

*receiving, at the resource consumer device, a coherency attribute for the one or more of the plurality of resource nodes; and*

*wherein said determining, using the resource consumer device, the coherency of the disaggregated resource based at least in part on the node names is further based at least in part on the coherency attribute.*

*12. The method of claim 11,*

*wherein the organizational structure of the plurality of resource nodes includes a sequence of the plurality of resource nodes; and*

*wherein the coherency attribute of the one or more of the plurality of resource nodes is indicative of an additional resource node that is later in the sequence.*

*13. The method of claim 9, wherein the resource map correlates one or more of the logical resource element identifiers to each of the plurality of resource nodes.*

*14. The method of claim 13, wherein each of the logical resource element identifiers corresponds to a physical resource.*

*15. The method of claim 9, wherein the node name is configured to indicate a group type of the corresponding one of the plurality of resource nodes.*

*16. The method of claim 9, wherein the resource consumer device comprises a resource manager device.*

*17. A non-transitory computer-readable medium having instructions stored thereon that, when executed by a resource consumer device, cause the resource consumer device to:*

*discover a plurality of resource nodes each being associated with a corresponding unique protocol address;*

*receive node names corresponding to one or more of the plurality of resource nodes;*

*determine an organizational structure of the plurality of resource nodes based at least in part on the node names, the organizational structure being a parallel structure that enables access to a data set through at least two of the plurality of resource nodes or a serial structure that enables access to a first data block of the*

*data set through a first resource node and to a second data block consecutive to the first data block of the data set through a second resource node;*

*generate a resource map that maps a correspondence between a plurality of logical resource element identifiers and the plurality of resource nodes based at least in part on the organizational structure, the resource map indicative of translations used by processors of the resource nodes to determine if any action is required in response to access request communications received by the processors, the translations between the logical resource element identifiers and physical addresses;*

*generate a message to one or more of the resource nodes based on the resource map; and*

*transmitting the message to the one or more resource nodes.*

*18. The non-transitory computer-readable medium of claim 17, wherein execution of the instructions cause the resource consumer device further to:*

*determine a coherency of a disaggregated resource that includes the plurality of resource nodes based at least in part on the node names received from the one or more of the plurality of resource nodes.*

*19. The non-transitory computer-readable medium of claim 18, wherein execution of the instructions cause the resource consumer device further to:*

*receive a coherency attribute for the one or more of the plurality of resource nodes; and*

*wherein said determine the coherency of the disaggregated resource based at least in part on the node names is further based at least in part on the coherency attribute.*

*20. The non-transitory computer-readable medium of claim 19,*

*wherein the organizational structure of the plurality of resource nodes includes a sequence of the plurality of resource nodes; and*

*wherein the coherency attribute of the one or more of the plurality of resource nodes is indicative of an additional resource node that is later in the sequence.*

*21. The non-transitory computer-readable medium of claim 17, wherein each of the logical resource element identifiers corresponds to a physical resource.*

*22. The non-transitory computer-readable medium of claim 17, wherein the node name is configured to indicate a group type of the corresponding one of the plurality of resource nodes.*

*23. The non-transitory computer-readable medium of claim 17, wherein the resource consumer device comprises a resource manager device.*

*24. A system, comprising:*

*a memory device to store instructions; and*

*one or more resource consumer devices to execute the instructions stored in the memory device to:*

*receive node names corresponding to one or more of a plurality of resource nodes, each of the plurality of resource nodes being associated with a corresponding unique protocol address;*

*determine an organizational structure of the plurality of resource nodes based at least in part on the node names, the organizational structure being a parallel structure that enables access to a data set through at least two of the plurality of resource nodes or a serial structure that enables access to a first data block of the data set through a first resource node and to a second data block consecutive to the first data block of the data set through a second resource node; and*

*generate a resource map that maps a correspondence between a plurality of logical resource element identifiers and the plurality of resource nodes based at least in part on the organizational structure, the resource map indicative of translations used by processors of the resource nodes to determine if any action is required in response to access request communications received by the processors, the translations between the logical resource element identifiers and physical addresses;*

*generate a message to one or more of the resource nodes based on the resource map; and*

*transmitting the message to the one or more resource nodes.*

*25. The system of claim 24, wherein the one or more resource consumer devices is configured to execute the instructions stored in the memory device further to:*

*determine a coherency of a disaggregated resource that includes the plurality of resource nodes based at least in part on the node names received from the one or more of the plurality of resource nodes.*

*26. The system of claim 25, wherein the one or more resource consumer devices is configured to execute the instructions stored in the memory device further to:*

*receive a coherency attribute for the one or more of the plurality of resource nodes; and*

*wherein said determine the coherency of the disaggregated resource based at least in part on the node names is further based at least in part on the coherency attribute.*

*27. The system of claim 26,*

*wherein the organizational structure of the plurality of resource nodes includes a sequence of the plurality of resource nodes; and*

*wherein the coherency attribute of the one or more of the plurality of resource nodes is indicative of an additional resource node that is later in the sequence.*

*28. The system of claim 24, wherein each of the plurality of logical resource element identifiers corresponds to a physical resource.*

*29. The system of claim 24, wherein the node name is configured to indicate a group type of the corresponding one of the plurality of resource nodes.*

*30. The system of claim 24, wherein the resource consumer device comprises a resource manager device.*

* * * * *